US012353164B2

(12) United States Patent
Maruyama et al.

(10) Patent No.: US 12,353,164 B2
(45) Date of Patent: Jul. 8, 2025

(54) ELECTROPHOTOGRAPHIC APPARATUS

(71) Applicant: CANON KABUSHIKI KAISHA, Tokyo (JP)

(72) Inventors: Akihiro Maruyama, Shizuoka (JP); Kenichi Kaku, Shizuoka (JP); Shuhei Iwasaki, Kanagawa (JP); Kohei Makisumi, Shizuoka (JP); Michiyo Sekiya, Shizuoka (JP); Kaname Watariguchi, Kanagawa (JP); Hideharu Shimozawa, Tokyo (JP); Tatsuya Yamaai, Kanagawa (JP); Takanori Mitani, Kanagawa (JP); Satoshi Nishida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 467 days.

(21) Appl. No.: 17/815,276

(22) Filed: Jul. 27, 2022

(65) Prior Publication Data

US 2023/0058278 A1 Feb. 23, 2023

(30) Foreign Application Priority Data

Aug. 6, 2021 (JP) ................................ 2021-130215

(51) Int. Cl.
*G03G 5/047* (2006.01)
*G03G 5/06* (2006.01)
(Continued)

(52) U.S. Cl.
CPC ........... *G03G 5/047* (2013.01); *G03G 5/0696* (2013.01); *G03G 5/144* (2013.01); *G03G 21/1814* (2013.01)

(58) Field of Classification Search
CPC ...... G03G 5/047; G03G 5/0696; G03G 5/144; G03G 21/1814
See application file for complete search history.

(56) References Cited

U.S. PATENT DOCUMENTS 4,882,257 A 11/1989 Maruyama
4,892,800 A 1/1990 Sugata
(Continued)

FOREIGN PATENT DOCUMENTS

JP 5-66638 A 3/1993
JP 2016-164610 A 9/2016
JP 6478721 B2 3/2019

OTHER PUBLICATIONS

U.S. Appl. No. 17/812,227, filed Jul. 13, 2022, Michiyo Sekiya.
(Continued)

*Primary Examiner* — Mark F. Huff
*Assistant Examiner* — Boone Alexander Evans
(74) *Attorney, Agent, or Firm* — VENABLE LLP

(57) ABSTRACT

The electrophotographic apparatus includes: an electrophotographic photosensitive member; a charging unit; an image-exposing unit; a charge transfer amount-sensing unit for sensing the amount of charge transferred to the electrophotographic photosensitive member; and an exposed portion potential-controlling unit for controlling the potential of each of the exposed portions of the electrophotographic photosensitive member based on a sensing result, which is obtained by charging the electrophotographic photosensitive member with the charging unit, performing image exposure with the image-exposing unit in at least one light amount weaker than a light amount in which the normalized radius of curvature R of the electrophotographic photosensitive member represented by the following equation (E1), the normalized radius of curvature being obtained by a method of measuring an EV curve, shows a minimum, and in at least two light amounts stronger than the light amount in which the normalized radius of curvature shows the minimum.

$$R = \frac{\left[1 + \left(\frac{dy}{dx}\right)^2\right]^{3/2}}{\left|\frac{d^2y}{dx^2}\right|} \quad \text{(E1)}$$

17 Claims, 5 Drawing Sheets

(51) Int. Cl.
*G03G 5/14* (2006.01)
*G03G 21/18* (2006.01)

(56) References Cited

U.S. PATENT DOCUMENTS 4,898,799 A * 2/1990 Fujimaki ............. C09B 67/0002
430/58.65
5,176,976 A 1/1993 Kikuchi
5,352,552 A 10/1994 Maruyama
5,385,797 A 1/1995 Nagahara
5,391,446 A 2/1995 Ohtani
5,391,449 A 2/1995 Maruyama
5,422,210 A 6/1995 Maruyama
5,455,135 A 10/1995 Maruyama
5,484,673 A 1/1996 Kikuchi
5,667,926 A 9/1997 Maruyama
5,677,095 A 10/1997 Kikuchi
5,693,443 A 12/1997 Nakamura
5,729,801 A 3/1998 Maruyama
5,879,847 A 3/1999 Yoshinaga
5,888,690 A 3/1999 Yoshinaga
5,890,037 A 3/1999 Kukimoto
5,905,008 A 5/1999 Yoshinaga
5,910,386 A 6/1999 Yoshinaga
5,923,925 A 7/1999 Nakamura
6,016,414 A 1/2000 Anayama
6,110,628 A 8/2000 Sekiya
6,180,303 B1 1/2001 Uematsu
6,372,397 B1 4/2002 Maruyama
6,376,695 B1 4/2002 Kushibiki
6,416,915 B1 7/2002 Kikuchi
6,436,597 B2 8/2002 Maruyama
6,664,014 B1 12/2003 Kikuchi
7,141,341 B2 11/2006 Sekido
7,175,706 B2 2/2007 Mizutani
7,187,890 B2 3/2007 Nishida
7,378,205 B2 5/2008 Sekiya
7,563,553 B2 7/2009 Kikuchi
7,585,604 B2 9/2009 Ogaki
7,910,274 B2 3/2011 Tanaka
7,927,774 B2 4/2011 Ogaki
8,343,699 B2 1/2013 Nagasaka
8,465,889 B2 6/2013 Sekido
8,524,430 B2 9/2013 Takagi
8,546,050 B2 10/2013 Maruyama
8,632,931 B2 1/2014 Sekido
8,783,209 B2 7/2014 Kaku
8,795,936 B2 8/2014 Sekido
8,841,052 B2 9/2014 Watariguchi
8,974,991 B2 3/2015 Kawahara
9,029,054 B2 5/2015 Okuda
9,034,545 B2 5/2015 Maruyama
9,063,505 B2 6/2015 Sekiya
9,068,083 B2 6/2015 Tanaka
9,069,267 B2 6/2015 Kaku
9,235,144 B2 1/2016 Yamamoto
9,274,442 B2 3/2016 Sato
9,280,071 B2 3/2016 Maruyama
9,436,106 B2 9/2016 Kuno
9,436,107 B2 9/2016 Murakami
9,459,542 B2 10/2016 Tanaka
9,500,966 B2 11/2016 Watariguchi
9,507,283 B2 11/2016 Maruyama
9,523,929 B2 12/2016 Nakamura
9,535,346 B2 1/2017 Sekiya
9,535,347 B2 1/2017 Watariguchi
9,563,139 B2 2/2017 Kawahara
9,599,917 B2 3/2017 Okuda
9,645,515 B2 5/2017 Kuno
9,645,516 B2 5/2017 Kawahara
9,651,879 B2 5/2017 Maruyama
9,726,992 B2 8/2017 Sakuma
9,760,030 B2 9/2017 Sekiya
9,772,568 B2 9/2017 Sekido
9,811,011 B2 11/2017 Nishi
9,851,648 B2 12/2017 Nishi
9,864,285 B2 1/2018 Nishi
9,869,032 B2 1/2018 Kuwahara
9,921,498 B2 3/2018 Sekido
10,162,278 B2 12/2018 Kuno
10,203,617 B2 2/2019 Kuno
10,303,085 B2 5/2019 Sato
10,372,050 B2 8/2019 Nishi
10,416,581 B2 9/2019 Ito
10,452,021 B2 10/2019 Miura
10,539,892 B2 1/2020 Nishida
10,545,453 B2 1/2020 Iwasaki
10,558,132 B2 2/2020 Ishiduka
10,558,133 B2 2/2020 Nakamura
10,642,177 B2 5/2020 Nakamura
10,663,913 B2 5/2020 Yamaai
10,691,033 B2 6/2020 Nishida
10,747,130 B2 8/2020 Okuda
10,747,131 B2 8/2020 Watanabe
10,831,117 B2 11/2020 Sakakibara
10,831,118 B2 11/2020 Watanabe
10,838,315 B2 11/2020 Shimozawa
10,942,462 B2 3/2021 Ito
11,003,102 B2 5/2021 Ishiduka
11,112,719 B2 9/2021 Makisumi
11,126,097 B2 9/2021 Ishida
11,137,716 B2 10/2021 Hiyama
11,150,566 B2 10/2021 Iwasaki
11,181,837 B2 11/2021 Sekiya
11,237,493 B2 2/2022 Makisumi
11,249,407 B2 2/2022 Watariguchi
11,256,186 B2 2/2022 Shimozawa
11,340,553 B2 5/2022 Watariguchi
11,366,402 B2 6/2022 Ishiduka
11,392,050 B2 7/2022 Nishida
11,392,074 B2 7/2022 Ishida
2014/0004450 A1 1/2014 Tokimitsu
2014/0141362 A1 5/2014 Watariguchi
2014/0154618 A1 6/2014 Maruyama
2015/0093693 A1 4/2015 Watariguchi
2015/0185630 A1 7/2015 Ito
2015/0346617 A1 12/2015 Kawahara
2015/0362847 A1 12/2015 Tanaka
2017/0060018 A1 3/2017 Yamauchi
2018/0314171 A1* 11/2018 Watariguchi ......... G03G 5/0525
2019/0369516 A1* 12/2019 Nakamura ......... G03G 5/14786
2020/0064750 A1* 2/2020 Sekido ................... G03G 5/144
2020/0174385 A1 4/2020 Sakakibara
2021/0325793 A1 10/2021 Nakamura
2021/0325794 A1 10/2021 Iwasaki

OTHER PUBLICATIONS

U.S. Appl. No. 17/814,048, filed Jul. 21, 2022, Kaname Watariguchi.
U.S. Appl. No. 17/814,603, filed Jul. 25, 2022, Hideharu Shimozawa.
U.S. Appl. No. 17/814,655, filed Jul. 25, 2022, Tatsuya Yamaai.
U.S. Appl. No. 17/816,024, filed Jul. 29, 2022, Kenichi Kaku.
U.S. Appl. No. 17/816,028, filed Jul. 29, 2022, Kohei Makisumi.
U.S. Appl. No. 17/936,088, filed Sep. 28, 2022, Shuntaro Watanabe.
U.S. Appl. No. 17/937,509, filed Oct. 3, 2022, Nobuhiro Nakamura.

* cited by examiner

ELECTROPHOTOGRAPHIC APPARATUS

BACKGROUND OF THE INVENTION

Field of the Invention

The present invention relates to an electrophotographic apparatus.

Description of the Related Art

In recent years, an electrophotographic apparatus having higher image quality has been required, and hence there has been desired the provision of such an apparatus that the quality of an image to be output has high stability even when an external environment, such as a temperature or a humidity, changes, and even when the apparatus is repeatedly used.

In an electrophotographic apparatus using an electrophotographic photosensitive member (also referred to as "photosensitive member"), such as a copying machine, a laser beam printer, or a facsimile, image formation is performed as described below. First, the photosensitive member is uniformly charged, and an electrostatic latent image is formed on the photosensitive member with an image-exposing unit such as a laser scanner. Next, the electrostatic latent image is developed with toner to form a toner image on the photosensitive member. The toner image is transferred from the photosensitive member onto a transfer material such as paper, and the transferred toner image is fixed with heat, a pressure, or the like.

Incidentally, it has been known that when the photosensitive member is charged with a charging unit such as a charging roller, such a voltage that a high voltage is applied to the charging roller, and hence discharge starts to occur between the roller and the photosensitive member is changed by, for example, an environment (a temperature and a humidity) in which the electrophotographic apparatus is placed, repeated use of the apparatus, or the thickness of the photosensitive member. In addition, it has been known that the photosensitivity of the photosensitive member is also changed by, for example, the environment, the repeated use, or the thickness, and hence even when the photosensitive member is irradiated with light having constant intensity by using the image-exposing unit, the surface potential of the photosensitive member changes. Accordingly, there occurs a problem in that even when the development potential of the photosensitive member is constant, a change in surface potential of the photosensitive member, in particular, potential of its exposed portion subjected to image exposure occurs to preclude the obtainment of a target image density.

As a method of suppressing a shift with respect to the target density due to a change in surface potential of the photosensitive member caused by the above-mentioned various factors (maintaining image quality constant), in Japanese Patent Application Laid-Open No. H05-66638, there has been proposed a method including arranging a surface potentiometer to directly measure the surface potential of a photosensitive member and performing density control based on the measured value. However, the surface potential-measuring method of Japanese Patent Application Laid-Open No. H05-66638 involves a problem in that a space for the arrangement of the potentiometer needs to be secured in an electrophotographic apparatus, and the method is costly.

In addition, there has been proposed such a surface potential-measuring method as described in Japanese Patent No. 6478721 in which no potentiometer is arranged, the method including utilizing a transfer roller in contact with a photosensitive member. The method includes: applying a voltage to the surface of the photosensitive member with the transfer roller to charge the photosensitive member; measuring the value of a current flowing in the photosensitive member; and performing correction with the value of the applied voltage and the measured current value to determine the surface potential of the photosensitive member. However, the correction requires the grasp of the amounts of a change in potential characteristic of the photosensitive member with various fluctuation factors, and at the time of the correction, a step of controlling the measured value to an output value after the correction needs to be followed.

SUMMARY OF THE INVENTION

As described above, when, in order to stably maintain the quality of an image to be output, the potentiometer is used for maintaining the surface potential constant, the size of the electrophotographic apparatus has increased, and the cost thereof has also increased. In addition, in the above-mentioned surface potential control in which no potentiometer is used, a procedure of determining the corrected value from the actually measured current value needs to be followed, and hence problems, such as an increase in cost and accuracy deterioration resulting from the fact that a complicated step is followed, have occurred.

An object of the present invention is to provide an electrophotographic apparatus, which can, while suppressing its size and cost, control the potential of an exposed portion of an electrophotographic photosensitive member in a short time period and with high accuracy through the performance of simple surface potential control that cannot be achieved until the amount of a current (charge transfer amount per unit time) flowing in the exposed portion of the photosensitive member is sensed, and is combined with a specific electrical characteristic of the photosensitive member.

The above-mentioned object is achieved by the present invention described below.

That is, according to the present invention, there is provided an electrophotographic apparatus including: an electrophotographic photosensitive member; a charging unit for charging the electrophotographic photosensitive member; an image-exposing unit for irradiating a surface of the electrophotographic photosensitive member with image exposure light to form an electrostatic latent image on the surface of the electrophotographic photosensitive member; a developing unit for developing the electrostatic latent image with toner to form a toner image on the surface of the electrophotographic photosensitive member; a transferring unit for transferring the toner image from the surface of the electrophotographic photosensitive member onto a transfer material; a charge transfer amount-sensing unit for sensing an amount of charge transferred to the electrophotographic photosensitive member by discharge per unit time; and an exposed portion potential-controlling unit for controlling a potential of each of exposed portions of the electrophotographic photosensitive member based on a sensing result obtained by charging the electrophotographic photosensitive member with the charging unit, performing image exposure with the image-exposing unit in at least one light amount weaker than a light amount in which a normalized radius of curvature R of the electrophotographic photosensitive member represented by the following equation (E1) shows a minimum, and in at least two light amounts stronger than the light amount in which the normalized radius of curvature R shows the minimum, and sensing an amount of charge transferred to the electrophotographic photosensitive member per unit time at a time of charging of the exposed portion with the charge transfer amount-sensing unit, wherein the normalized radius of curvature R of the electrophotographic photosensitive member has a minimum of 0.24 or less, which is calculated from the following equation (E1) in a graph whose axis of abscissa and axis of ordinate indicate an "x" and a "y", respectively, the graph being obtained as described below:

when, at a temperature of 23.5 [° C.] and a relative humidity of 50 [% RH], (1) a surface potential of the electrophotographic photosensitive member is set to 0 [V], (2) the electrophotographic photosensitive member is charged for 0.005 second so that an absolute value of an initial surface potential of the electrophotographic photosensitive member becomes 500 [V], (3) the electrophotographic photosensitive member is exposed to light having a wavelength of 805 [nm] and an intensity of 25 [mW/cm$^2$] in a light amount $I_{exp}$ [μJ/cm$^2$] for "t" seconds continuously 0.02 second after a start of the charging, and (4) an absolute value of the surface potential of the electrophotographic photosensitive member after the exposure obtained through measurement 0.06 second after the start of the charging is represented by $V_{exp}$ [V], in a graph whose axis of abscissa and axis of ordinate indicate the $I_{exp}$ and the $V_{exp}$, respectively, the graph being obtained by repeatedly performing the measurements (1) to (4) while changing the $I_{exp}$ from 0.000 [μJ/cm$^2$] to 1.000 [μJ/cm$^2$] at intervals of 0.001 [μJ/cm$^2$] through a change in "t", when a light amount when the $V_{exp}$ of the graph=250 [V] is represented by $I_{1/2}$ [μJ/cm$^2$], a normalized light amount obtained by normalizing the axis of abscissa $I_{exp}$ so that $10 \cdot I_{1/2}$ becomes 1 is represented by "x", and a normalized surface potential obtained by normalizing the axis of ordinate $V_{exp}$ so that a value 500 [V] of the axis of ordinate (x=0) of the graph becomes 1 and a value thereof when x=1 becomes 0 is represented by $$R = \frac{\left[1 + \left(\frac{dy}{dx}\right)^2\right]^{3/2}}{\left|\frac{d^2y}{dx^2}\right|} \quad \text{(E1)}$$

According to the present invention, the electrophotographic apparatus, which can, while suppressing its size and cost, control the potential of the exposed portion of the electrophotographic photosensitive member in a short time period and with high accuracy through the performance of simple surface potential control that cannot be achieved until the amount of a current (charge transfer amount per unit time) flowing in the exposed portion of the photosensitive member is sensed, and is combined with a specific electrical characteristic of the photosensitive member, can be provided.

Further features of the present invention will become apparent from the following description of exemplary embodiments with reference to the attached drawings.

DESCRIPTION OF THE EMBODIMENTS

Figure 1:
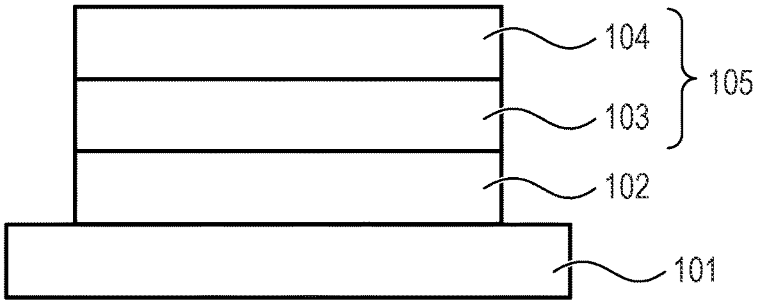
FIG. 1 is a view for illustrating an example of the layer configuration of an electrophotographic photosensitive member according to the present invention.

The present invention is described in detail below by way of exemplary embodiments.

An electrophotographic apparatus according to the present invention is an electrophotographic apparatus including: an electrophotographic photosensitive member; a charging unit for charging the electrophotographic photosensitive member; an image-exposing unit for irradiating a surface of the electrophotographic photosensitive member with image exposure light to form an electrostatic latent image on the surface of the electrophotographic photosensitive member; a developing unit for developing the electrostatic latent image with toner to form a toner image on the surface of the electrophotographic photosensitive member; a transferring unit for transferring the toner image from the surface of the electrophotographic photosensitive member onto a transfer material; a charge transfer amount-sensing unit for sensing an amount of charge transferred to the electrophotographic photosensitive member by discharge per unit time; and an exposed portion potential-controlling unit for controlling a potential of each of exposed portions of the electrophotographic photosensitive member based on a sensing result obtained by charging the electrophotographic photosensitive member with the charging unit, performing image exposure with the image-exposing unit in at least one light amount weaker than a light amount in which a normalized radius of curvature R of the electrophotographic photosensitive member represented by the following equation (E1) shows a minimum, and in at least two light amounts stronger than the light amount in which the normalized radius of curvature R shows the minimum, and sensing an amount of charge transferred to the electrophotographic photosensitive member per unit time at a time of charging of the exposed portion with the charge transfer amount-sensing unit, wherein the normalized radius of curvature R of the electrophotographic photosensitive member has a minimum of 0.24 or less, which is calculated from the following equation (E1) in a graph whose axis of abscissa and axis of ordinate indicate an "x" and a "y", respectively, the graph being obtained as described below:

when, at a temperature of 23.5 [° C.] and a relative humidity of 50 [% RH], (1) a surface potential of the electrophotographic photosensitive member is set to 0 [V], (2) the electrophotographic photosensitive member is charged for 0.005 second so that an absolute value of an initial surface potential of the electrophotographic photosensitive member becomes 500 [V], (3) the electrophotographic photosensitive member is exposed to light having a wavelength of 805 [nm] and an intensity of 25 [$mW/cm^2$] in a light amount $I_{exp}$ [$\mu J/cm^2$] for "t" seconds continuously 0.02 second after a start of the charging, and (4) an absolute value of the surface potential of the electrophotographic photosensitive member after the exposure obtained through measurement 0.06 second after the start of the charging is represented by $V_{exp}$ [V], in a graph whose axis of abscissa and axis of ordinate indicate the $I_{exp}$ and the $V_{exp}$, respectively, the graph being obtained by repeatedly performing the measurements (1) to (4) while changing the $I_{exp}$ from 0.000 [$\mu J/cm^2$] to 1.000 [$\mu J/cm^2$] at intervals of 0.001 [$\mu J/cm^2$] through a change in "t", when a light amount when the $V_{exp}$ of the graph=250 [V] is represented by $I_{1/2}$ [$\mu J/cm^2$], a normalized light amount obtained by normalizing the axis of abscissa $I_{exp}$ so that $10 \cdot I_{1/2}$ becomes 1 is represented by "x", and a normalized surface potential obtained by normalizing the axis of ordinate $V_{exp}$ so that a value 500 [V] of the axis of ordinate (x=0) of the graph becomes 1 and a value thereof when x=1 becomes 0 is represented by "y".

$$R = \frac{\left[1 + \left(\frac{dy}{dx}\right)^2\right]^{3/2}}{\left|\frac{d^2y}{dx^2}\right|} \quad \text{(E1)}$$

Figure 3:
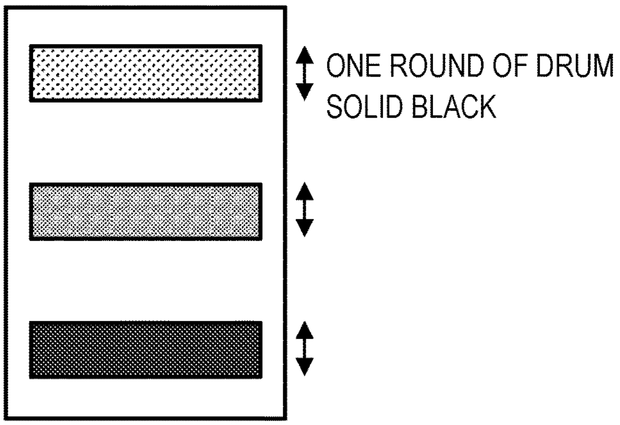
FIG. 3 is an illustration of a latent image formation pattern at the time of sensing with a charge transfer amount-sensing unit.
Figure 4:
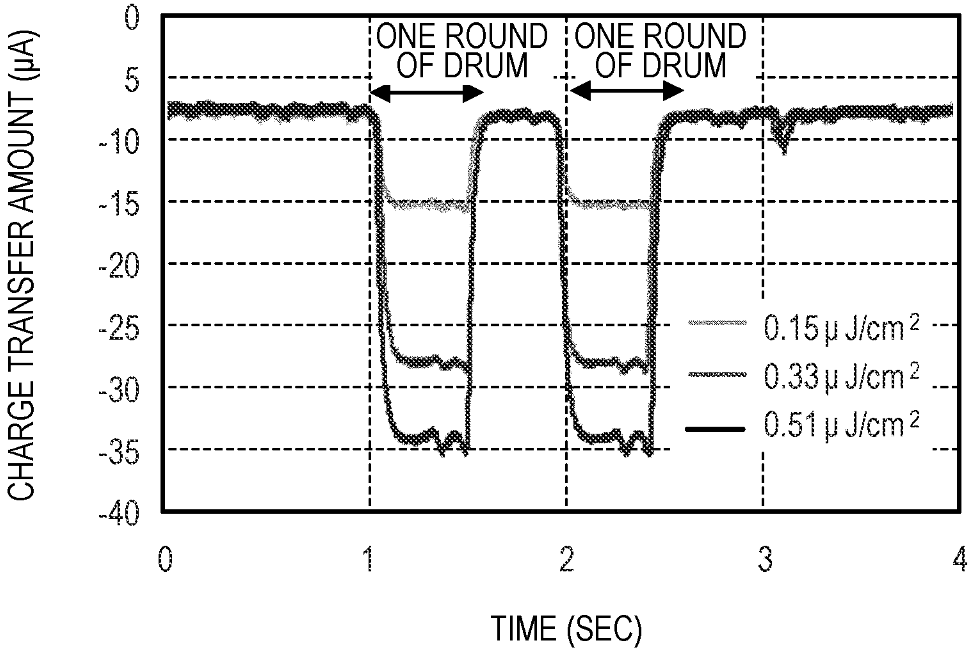
FIG. 4 is a graph for showing an image exposure amount and a charge transfer amount when the latent image pattern illustrated in FIG. 3 is formed in an electrophotographic photosensitive member according to Example 1.
Figure 5:
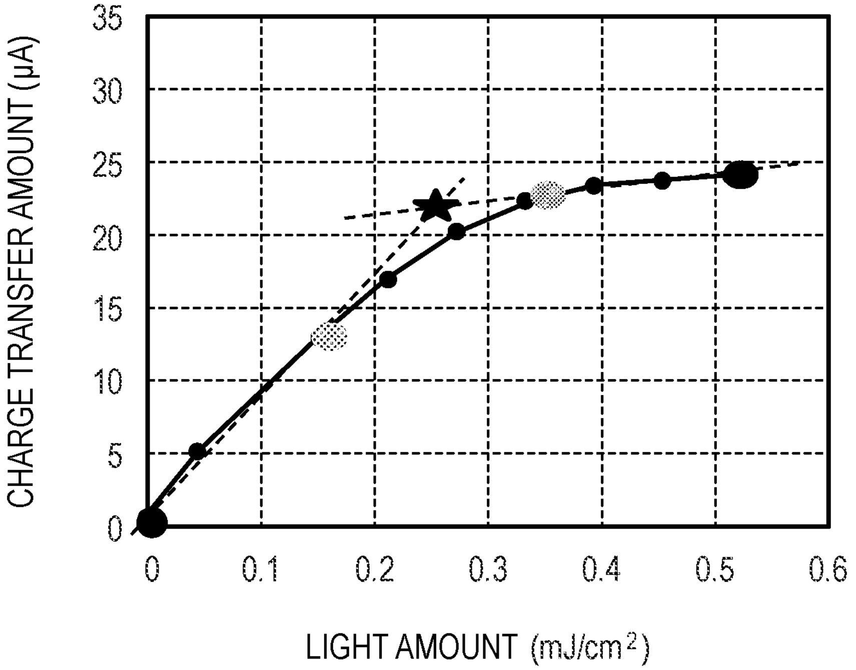
FIG. 5 is a graph for showing a relationship between a charge transfer amount and a light amount in the electrophotographic photosensitive member according to Example 1, the graph being for showing the light amount (★) at the minimum of a normalized radius of curvature R.

The charge transfer amount-sensing unit for sensing a charge transfer amount per unit time is a simple unit utilizing a current-sensing function built in a high-voltage power source (illustrated in FIG. 2) included as the charging unit for charging the electrophotographic photosensitive member in the electrophotographic apparatus. That is, the electrophotographic photosensitive member is charged with the charging unit, and image exposure is performed with the image-exposing unit in at least one light amount weaker than the light amount in which the normalized radius of curvature R of the electrophotographic photosensitive member represented by the following equation (E1) shows the minimum. Further, image exposure is performed in at least two light amounts stronger than the light amount in which the normalized radius of curvature shows the minimum. That is, such a latent image as illustrated in FIG. 3 or FIG. 4 is formed on the photosensitive member. In other words, the image exposure is performed on at least three points of the photosensitive member while the light amount is changed, to thereby form three patterns of the electrostatic latent image (the number of the exposed points and the pattern may be optionally controlled). After that, a current flowed in each of the exposed portions by charging the exposed portion with the charging unit, and the charge transfer amount per unit time are measured through utilization of the current-sensing function (charge transfer amount-sensing unit) of the high-voltage power source. An image exposure amount can be determined (a light amount can be sensed and the sensed light amount can be determined) by graphing the sensing results as shown in FIG. 5, and determining the light amount at the point of intersection of extended lines. Thus, the potential of the exposed portion can be controlled. To perform the sensing in a shorter time period and with higher accuracy, the number of the exposed points is preferably smaller.

The sensing unit is achieved by using the following electrophotographic photosensitive member characteristic:

the normalized radius of curvature R of the electrophotographic photosensitive member has a minimum of 0.24 or less, which is calculated from the following equation (E1) in a graph whose axis of abscissa and axis of ordinate indicate an "x" and a "y", respectively, the graph being obtained as described below:

when, at a temperature of 23.5 [° C.] and a relative humidity of 50 [% RH], (1) a surface potential of the electrophotographic photosensitive member is set to 0 [V], (2) the electrophotographic photosensitive member is charged for 0.005 second so that an absolute value of an initial surface potential of the electrophotographic photosensitive member becomes 500 [V], (3) the electrophotographic photosensitive member is exposed to light having a wavelength of 805 [nm] and an intensity of 25 [$mW/cm^2$] in a light amount $I_{exp}$ [$\mu J/cm^2$] for "t" seconds continuously 0.02 second after a start of the charging, and (4) an absolute value of the surface potential obtained through measurement 0.06 second after the start of the charging is represented by $V_{exp}$ [V], in a graph whose axis of abscissa and axis of ordinate indicate the $I_{exp}$ and the $V_{exp}$, respectively, the graph being obtained by repeatedly performing the measurements (1) to (4) while changing the $I_{exp}$ from 0.000 [$\mu J/cm^2$] to 1.000 [$\mu J/cm^2$] at intervals of 0.001 [$\mu J/cm^2$] through a change in "t", when a light amount when the $V_{exp}$ of the graph=250 [V] is represented by $I_{1/2}$ [$\mu J/cm^2$], a normalized light amount obtained by normalizing the axis of abscissa $I_{exp}$ so that $10 \cdot I_{1/2}$ becomes 1 is represented by "x", and a normalized surface potential obtained by normalizing the axis of ordinate $V_{exp}$ so that a value 500 [V] of the axis of ordinate of the graph becomes 1 and a value thereof when x=1 becomes 0 is represented by "y".

$$R = \frac{\left[1 + \left(\frac{dy}{dx}\right)^2\right]^{3/2}}{\left|\frac{d^2y}{dx^2}\right|} \quad \text{(E1)}$$

Figure 6:
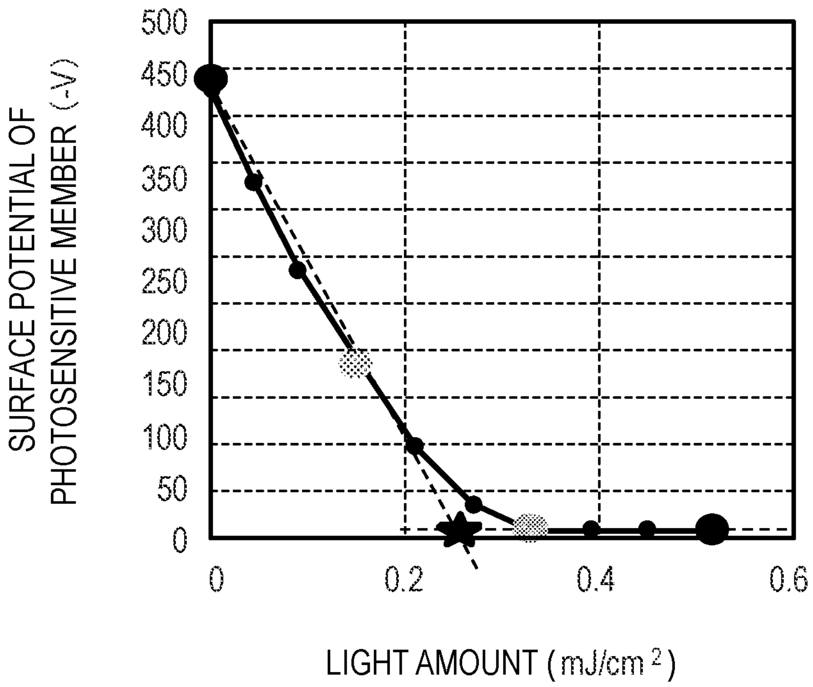
FIG. 6 is a graph for showing the light amount (★) at the minimum of the normalized radius of curvature R based on a transition in surface potential when the image exposure amount of the photosensitive member used in FIG. 4 is changed.

In the case of the electrophotographic photosensitive member whose normalized radius of curvature R has a minimum of 0.24 or less, as shown in the graphs of FIG. 5 and FIG. 6, the result obtained with the charge transfer amount-sensing unit and the image exposure amount in the actual E-V result (hereinafter sometimes referred to as "EV curve") of the electrophotographic photosensitive member coincide with each other at the point at which the normalized radius of curvature R shows the minimum.

In view of the foregoing, the potential of the exposed portion can be controlled in a short time period and with high accuracy by the combination of the sensing unit and the electrophotographic photosensitive member. In addition, as a more preferred range, the minimum of the normalized radius of curvature R is 0.21 or less because the control can be performed in a shorter time period and with higher accuracy. The EV curve refers to a relationship between the amount $I_{exp}$ [μJ/cm$^2$] of the light to which the photosensitive member is exposed and the absolute value $V_{exp}$ [V] of its surface potential at the time.

[Method of Evaluating EV Curve of Electrophotographic Photosensitive Member]

A method of measuring the E-V curve in the present invention is described below.

First, quartz glass obtained as follows is prepared (hereinafter referred to as "NESA glass"): an ITO film serving as a transparent ITO electrode is deposited from the vapor onto quartz glass so that the surface of the glass has a sheet resistance of 1,000 [Ω/sq] or less; and the entire surface of the resultant is subjected to optical polishing so that the resultant becomes transparent. The surface of the photosensitive member is brought into close contact with the NESA glass. At this time, when the photosensitive member is a flat plate shape, smooth NESA glass is used, and when the photosensitive member is a cylindrical shape, curved NESA glass is used. The surface of the photosensitive member can be charged by applying a voltage from the high-voltage power source to the NESA glass under the state. In addition, when flat light having a wavelength of 805 [nm] and an intensity of 25 [mW/cm$^2$] is applied from the lower surface of the NESA glass, the surface of the photosensitive member is exposed, and hence the surface potential thereof can be optically decayed.

When the above-mentioned measuring system is used, the light having an intensity of 25 [mW/cm$^2$], which is stronger than exposure light to be applied to a photosensitive member in an electrophotographic apparatus expected in recent years or in the future, can be applied to the photosensitive member for a short time period and once, and at the same time, the charging and exposure of the photosensitive member can be repeated in a cycle faster than the process speed of the electrophotographic apparatus expected in recent years or in the future. Thus, a large amount of data in increments of 0.001 [μJ/cm$^2$] can be stably and simply acquired to provide the EV curve of the photosensitive member of the present invention. In addition, at the same time, a photosensitive member characteristic, which can correspond to the shortening of an exposure irradiation time due to an increase in process speed in recent years or through the future, and a reduction in number of times of exposure when an exposure method is changed from a currently mainstream laser scanning optical system to a LED array, can be evaluated by the above-mentioned measurement method achieved by using the measuring system. In particular, the light irradiation conditions that the photosensitive member be exposed to the light having an intensity of 25 [mW/cm$^2$] for a short time period and once are an EV curve-measuring method that is sufficiently strict through the future in light of the reciprocity failure characteristic of the photosensitive member.

In addition, when, at a temperature of 23.5 [° C.] and a relative humidity of 50 [% RH], (1) a surface potential of the electrophotographic photosensitive member is set to 0 [V], (2) the electrophotographic photosensitive member is charged for 0.005 second so that an absolute value of an initial surface potential of the electrophotographic photosensitive member becomes 500 [V], (3) the electrophotographic photosensitive member is exposed to light having a wavelength of 805 [nm] and an intensity of 25 [mW/cm$^2$] in a light amount $I_{exp}$ [μJ/cm$^2$] for "t" seconds continuously 0.02 second after a start of the charging, and (4) an absolute value of the surface potential of the electrophotographic photosensitive member after the exposure obtained through measurement 0.06 second after the start of the charging is represented by $V_{exp}$ [V], in a graph whose axis of abscissa and axis of ordinate indicate the $I_{exp}$ and the $V_{exp}$, respectively, the graph being obtained by repeatedly performing the measurements (1) to (4) while changing the $I_{exp}$ from 0.000 [μJ/cm$^2$] to 1.000 [μJ/cm$^2$] at intervals of 0.001 [μJ/cm$^2$] through a change in "t", when a normalized light amount "x" when a normalized surface potential "y" of the graph=0.5 is represented by $Is_{0.5}$ [μJ/cm$^2$], a quadruple light amount of the light amount $Is_{0.5}$ is represented by $4Is_{0.5}$ [μJ/cm$^2$], a quintuple light amount thereof is represented by $5Is_{0.5}$ [μJ/cm$^2$], the y when $x=4Is_{0.5}$ is represented by y4, and the y when $x=5Is_{0.5}$ is represented by y5, slopes S2 and S3 of the electrophotographic photosensitive member calculated from the following equations (E2) and (E3), respectively satisfy S2≥3.0 and S3≤0.41.

$$S2 = 0.5/Is_{0.5} \quad \text{(E2)}$$

$$S3 = \frac{|y4 - y5|}{|4Is_{0.5} - 5Is_{0.5}|} \quad \text{(E3)}$$

In view of the foregoing, the potential of the exposed portion can be controlled in a short time period and with high accuracy by the combination of the sensing unit and the electrophotographic photosensitive member. In addition, the slope S3 is more preferably 0.21 or less because the control can be performed in a shorter time period and with higher accuracy. In addition, the S3 is still more preferably 0.15 or less because the control can be performed in an even shorter time period and with even higher accuracy.

In addition, in the electrophotographic apparatus of the present invention, it is more preferred that the exposed portion potential-controlling unit be a unit for controlling a potential of each of exposed portions of the electrophotographic photosensitive member based on a sensing result obtained by performing image exposure with the image-exposing unit in at least "n" light amounts where "n" represents an integer of 2 or more, the light amounts being weaker than the light amount in which the normalized radius of curvature R of the electrophotographic photosensitive member shows the minimum, and in at least "m" light amounts where "m" represents an integer of 3 or more, the light amounts being stronger than the light amount in which the normalized radius of curvature R shows the minimum, and sensing an amount of charge transferred to the electrophotographic photosensitive member per unit time at a time of charging of the exposed portion with the charge transfer amount-sensing unit.

[Electrophotographic Photosensitive Member]

The electrophotographic photosensitive member according to the present invention includes a support and a photosensitive layer formed on the support. FIG. 1 is a view for illustrating an example of the layer configuration of the electrophotographic photosensitive member. In FIG. 1, the support is represented by reference numeral 101, the undercoat layer is represented by reference numeral 102, the charge-generating layer is represented by reference numeral 103, the charge-transporting layer is represented by reference numeral 104, and the photosensitive layer (laminated photosensitive layer) is represented by reference numeral 105.

<Support>

In the present invention, the support is preferably an electroconductive support having electroconductivity. An example of the electroconductive support is a support in which a thin film of a metal, such as aluminum, chromium, silver, or gold, a thin film of an electroconductive material, such as indium oxide, tin oxide, or zinc oxide, or a thin film of an electroconductive ink added thereto a silver nanowire is formed on a support formed of a metal, such as aluminum, iron, nickel, copper, or gold, or an alloy, or an insulating support, such as a polyester resin, a polycarbonate resin, a polyimide resin, or glass.

The surface of the support may be subjected to, for example, electrochemical treatment such as anodization, wet honing treatment, blast treatment, or cutting treatment for improving its electrical characteristics and suppressing interference fringes. The shape of the support is, for example, a cylindrical shape or a film shape.

<Electroconductive Layer>

In the electrophotographic photosensitive member according to the present invention, an electroconductive layer may be arranged on the support. The arrangement of the electroconductive layer can cover the unevenness and defects of the support, and prevent interference fringes. The average thickness of the electroconductive layer is preferably 5 μm to 40 μm, more preferably 10 μm to 30 μm.

The electroconductive layer preferably contains electroconductive particles and a binder resin. Examples of the electroconductive particles include carbon black, metal particles, and metal oxide particles. Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, metal oxides are preferably used as the electroconductive particles, and in particular, titanium oxide, tin oxide, and zinc oxide are more preferably used.

When the metal oxides are used as the electroconductive particles, the surfaces of the metal oxides may be treated with a silane coupling agent or the like, or the metal oxides may be doped with an element, such as phosphorus or aluminum, or an oxide thereof. As the element and the oxide thereof for doping, there are given, for example, phosphorus, aluminum, niobium, and tantalum.

In addition, each of the electroconductive particles may be of a laminated construction having a core particle and a coating layer coating the particle. Examples of the core particle include titanium oxide, barium sulfate, and zinc oxide. Examples of the coating layer include metal oxides, such as tin oxide and titanium oxide.

In addition, when the metal oxides are used as the electroconductive particles, the volume-average particle diameter thereof is preferably 1 nm to 500 nm, more preferably 3 nm to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The average thickness of the electroconductive layer is preferably 1 μm to 50 μm, particularly preferably 3 μm to 40 μm.

The electroconductive layer may be formed by preparing a coating liquid for an electroconductive layer containing the above-mentioned materials and a solvent, forming a coat thereof, and drying the coat. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent. A dispersion method for the dispersion of the electroconductive particles in the coating liquid for an electroconductive layer is, for example, a method including using a paint shaker, a sand mill, a ball mill, or a liquid collision-type high-speed disperser.

<Undercoat Layer>

In the electrophotographic photosensitive member according to the present invention, a case in which the undercoat layer is arranged between the support and the charge-generating layer is preferably used. The undercoat layer preferably contains a polyamide resin and metal oxide particles. The metal oxide particles are preferably titanium oxide particles. A polyamide resin soluble in an alcohol-based solvent is preferred as the polyamide resin. For example, ternary (6-66-610) copolymerized polyamide, quaternary (6-66-610-12) copolymerized polyamide, N-methoxymethylated nylon, polymerized fatty acid-based polyamide, a polymerized fatty acid-based polyamide block copolymer, and copolymerized polyamide having a diamine component are preferably used.

From the viewpoint of the suppression of charge accumulation, the crystal structure of each of the titanium oxide particles is preferably a rutile type or an anatase type, and is more preferably a rutile type having weak photocatalytic activity. When the crystal structure is a rutile type, the rutilation ratio of the particles is preferably 90% or more. The shape of each of the titanium oxide particles is preferably a spherical shape, and the average primary particle diameter thereof is preferably 10 nm to 100 nm, more preferably 30 nm to 60 nm from the viewpoints of the suppression of charge accumulation and uniform dispersibility. The titanium oxide particles may be treated with a silane coupling agent or the like from the viewpoint of uniform dispersibility.

The undercoat layer in the present invention may contain an additive, such as organic matter particles or a leveling agent, in addition to the polyamide resin and the titanium oxide particles described above for the purpose of improving the formability of the undercoat layer of the electrophotographic photosensitive member. However, the content of the additive in the undercoat layer is preferably 10 mass % or less with respect to the total mass of the undercoat layer.

The average thickness of the undercoat layer is preferably 0.5 μm to 3.0 μm. When the thickness of the undercoat layer is 3.0 μm or less, the charge accumulation-suppressing effect of the layer is improved. When the thickness is less than 0.5

μm, leakage is liable to occur owing to a local reduction in charging performance of the layer.

A relationship between a charge-generating substance to be used in the charge-generating layer to be described later and the undercoat layer is preferably the following mode.

In the case of a hydroxygallium phthalocyanine pigment, the arithmetic average roughness Ra of the surface of the undercoat layer in JIS B0601:2001 and the average length Rsm of the roughness curve elements thereof preferably satisfy the formula (A) "Ra≤50 nm" and the formula (B) "0.1≤Ra/Rsm≤0.5". When the Ra is more than 50 nm or when the ratio Ra/Rsm is less than 0.1, the scales of the recessed portions of the undercoat layer become larger than the scales of hydroxygallium phthalocyanine pigment particles, and hence the area of contact between the portions and the particles reduces. Accordingly, the transfer of generated charge becomes slower, and hence a reducing effect on the normalized radius of curvature cannot be sufficiently obtained. The Ra is more preferably 30 nm or less from the viewpoint of the normalized radius of curvature. When the ratio Ra/Rsm is more than 0.5, the recessed portions of the undercoat layer become deeper to preclude the entry of the hydroxygallium phthalocyanine pigment particles into the recessed portions. Thus, a binder resin enters a space between the undercoat layer and the hydroxygallium phthalocyanine pigment particles to reduce the area of contact. Accordingly, the reducing effect on the normalized radius of curvature cannot be sufficiently obtained.

In the case of titanyl phthalocyanine pigment particles, the arithmetic average roughness Ra of the surface of the undercoat layer in JIS B0601:2001 and the average length Rsm of the roughness curve elements thereof preferably satisfy the formula (A) "Ra≤120 nm" and the formula (B) "0.1≤Ra/Rsm≤0.5". When the Ra is more than 120 nm or when the ratio Ra/Rsm is less than 0.1, the scales of the recessed portions of the undercoat layer become larger than the scales of titanyl phthalocyanine pigment particles, and hence the area of contact between the portions and the particles reduces. Accordingly, the transfer of generated charge becomes slower, and hence a reducing effect on the normalized radius of curvature cannot be sufficiently obtained. The Ra is more preferably 100 nm or less from the viewpoint of transfer memory suppression. When the ratio Ra/Rsm is more than 0.5, the recessed portions of the undercoat layer become deeper to preclude the entry of the titanyl phthalocyanine pigment particles into the recessed portions. Thus, the binder resin enters a space between the undercoat layer and the titanyl phthalocyanine pigment particles to reduce the area of contact. Accordingly, the transfer of the generated charge becomes slower, and hence the reducing effect on the normalized radius of curvature cannot be sufficiently obtained.

The undercoat layer may be formed by preparing a coating liquid for an undercoat layer containing the above-mentioned materials and a solvent, forming a coat thereof, and drying and/or curing the coat. Examples of the solvent to be used for the coating liquid include an alcohol-based solvent, a ketone-based solvent, an ether-based solvent, an ester-based solvent, and an aromatic hydrocarbon-based solvent. A dispersion method for the dispersion of the titanium oxide particles in the coating liquid for an undercoat layer is, for example, a method including using ultrasonic dispersion, a paint shaker, a sand mill, a ball mill, or a liquid collision-type high-speed disperser.

<Charge-Generating Layer>

In the electrophotographic photosensitive member according to the present invention, a case in which the charge-generating layer is arranged directly above the undercoat layer is preferably used. The charge-generating layer of the electrophotographic photosensitive member according to the present invention is obtained by: dispersing the phthalocyanine pigment serving as the charge-generating substance and as required, a binder resin in a solvent to prepare a coating liquid for a charge-generating layer; forming a coat of the coating liquid for a charge-generating layer; and drying the coat.

The coating liquid for a charge-generating layer may be prepared as follows: only the charge-generating substance is added to the solvent, and the mixture is subjected to dispersion treatment; and then, the binder resin is added thereto. Alternatively, the coating liquid may be prepared by adding the charge-generating substance and the binder resin together to the solvent, and subjecting the mixture to dispersion treatment.

At the time of the dispersion, a medium-type disperser, such as a sand mill or a ball mill, or a disperser, such as a liquid collision-type disperser or an ultrasonic disperser, may be used.

Examples of the binder resin to be used for the charge-generating layer include resins (insulating resins), such as a polyvinyl butyral resin, a polyvinyl acetal resin, a polyarylate resin, a polycarbonate resin, a polyester resin, a polyvinyl acetate resin, a polysulfone resin, a polystyrene resin, a phenoxy resin, an acrylic resin, a phenoxy resin, a polyacrylamide resin, a polyvinylpyridine resin, a urethane resin, an agarose resin, a cellulose resin, a casein resin, a polyvinyl alcohol resin, a polyvinylpyrrolidone resin, a vinylidene chloride resin, an acrylonitrile copolymer, and a polyvinyl benzal resin. In addition, organic photoconductive polymers, such as poly-N-vinylcarbazole, polyvinylanthracene, and polyvinylpyrene, may also be used. In addition, the binder resins may be used alone or as a mixture or a copolymer thereof.

Examples of the solvent to be used for the coating liquid for a charge-generating layer include toluene, xylene, tetralin, chlorobenzene, dichloromethane, chloroform, trichloroethylene, tetrachloroethylene, carbon tetrachloride, methyl acetate, ethyl acetate, propyl acetate, methyl formate, ethyl formate, acetone, methyl ethyl ketone, cyclohexanone, diethyl ether, dipropyl ether, propylene glycol monomethyl ether, dioxane, methylal, tetrahydrofuran, water, methanol, ethanol, n-propanol, isopropanol, butanol, methyl cellosolve, methoxypropanol, dimethylformamide, dimethylacetamide, and dimethyl sulfoxide. In addition, the solvents may be used alone or as a mixture thereof. The thickness of the charge-generating layer is preferably 0.10 μm to 1.00 μm, more preferably 0.16 μm to 0.40 μm.

(Phthalocyanine Pigment)

In the present invention, a case in which the hydroxygallium phthalocyanine pigment is incorporated as the charge-generating substance is preferred. The pigment may have an axial ligand or a substituent. In the present invention, it is preferred that: the hydroxygallium phthalocyanine pigment include crystal particles each of which is a crystal form showing peaks at Bragg angles 2θ of 7.4°±0.3° and 28.2°±0.3° in an X-ray diffraction spectrum using a CuKα ray, and the pigment have a peak at 30 nm to 50 nm in a crystal particle size distribution measured by using small-angle X-ray scattering; and the peak have a half-width of 50 nm or less.

Further, the hydroxygallium phthalocyanine pigment more preferably includes crystal particles each containing, in itself, an amide compound represented by the following formula (A1). Examples of the amide compound represented by the formula (A1) include N-methylformamide, N-propylformamide, and N-vinylformamide.

(A1)

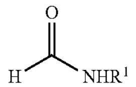

In the formula (A1), $R^1$ represents a methyl group, a propyl group, or a vinyl group.

In addition, the content of the amide compound represented by the formula (A1) to be incorporated into the crystal particles is preferably 0.1 mass % to 3.0 mass %, more preferably 0.1 mass % to 1.4 mass % with respect to the content of the crystal particles. When the content of the amide compound is 0.1 mass % to 3.0 mass %, the sizes of the crystal particles can be aligned to an appropriate size.

The phthalocyanine pigment containing the amide compound represented by the formula (A1) in each of its crystal particles is obtained through a step of subjecting a phthalocyanine pigment obtained by an acid pasting method and the amide compound represented by the formula (A1) to crystal conversion through wet milling treatment.

When a dispersant is used in the milling treatment, the amount of the dispersant is preferably 10 times to 50 times as large as that of the phthalocyanine pigment on a mass basis. In addition, examples of a solvent to be used include: amide-based solvents, such as N,N-dimethylformamide, N,N-dimethylacetamide, the compound represented by the formula (A1), N-methylacetamide, and N-methylpropionamide; halogen-based solvents such as chloroform; ether-based solvents such as tetrahydrofuran; and sulfoxide-based solvents such as dimethyl sulfoxide. In addition, the usage amount of the solvent is preferably 5 times to 30 times as large as that of the phthalocyanine pigment on a mass basis.

In addition, the inventors of the present invention have found that when an attempt is made to obtain the phthalocyanine pigment of the crystal form to be used in the present invention through a crystal conversion step, the use of the amide compound represented by the formula (A1) as the solvent lengthens a time period required for the conversion of the crystal form. Specifically, in the case where N-methylformamide is used as the solvent, the time period required for the crystal conversion increases severalfold as compared to that in the case where N,N-dimethylformamide is used. When a long time period is required for the crystal conversion, time grace for aligning the sizes of the crystal particles to a somewhat small size by the time when the conversion of the crystal form is completed is produced, and hence the above-mentioned phthalocyanine pigment can be easily obtained.

Whether or not the hydroxygallium phthalocyanine pigment contained, in each of its crystal particles, the amide compound represented by the formula (A1) was determined by analyzing the data of the $^1$H-NMR measurement of the resultant hydroxygallium phthalocyanine pigment. In addition, the content of the amide compound represented by the formula (A1) in the crystal particles was determined by the data analysis of the results of the $^1$H-NMR measurement. For example, when milling treatment, or a washing step after milling, with a solvent that can dissolve the amide compound represented by the formula (A1) is performed, the resultant hydroxygallium phthalocyanine pigment is subjected to the $^1$H-NMR measurement. When the amide compound represented by the formula (A1) is detected, it can be judged that the amide compound represented by the formula (A1) is incorporated into the crystal.

When the phthalocyanine pigment is obtained by centrifugation treatment, to control the ratio P of the volume of the charge-generating substance to the total volume of the charge-generating layer, a weight ratio between the phthalocyanine pigment and the binder resin in a mixed solution of the phthalocyanine pigment and the binder resin needs to be measured. The weight ratio between the phthalocyanine pigment and the binder resin in the mixed solution was determined by analyzing the data of the measurement of the solution. For example, when the hydroxygallium phthalocyanine pigment is used as the phthalocyanine pigment, and polyvinyl butyral is used as the binder resin, the weight ratio may be determined by comparing a peak derived from the hydroxygallium phthalocyanine pigment and a peak derived from polyvinyl butyral in the data of the $^1$H-NMR measurement to each other.

In the present invention, a case in which a titanyl phthalocyanine pigment is incorporated as the charge-generating substance is also preferably used. A case in which the titanyl phthalocyanine pigment includes crystal particles each of which is a crystal form showing peaks at Bragg angles 2θ of 9.8°±0.3° and 27.1°±0.3° in an X-ray diffraction spectrum using a CuKα ray, and the pigment has a peak at 50 nm to 150 nm in a crystal particle size distribution measured by using small-angle X-ray scattering, and the peak has a half-width of 100 nm or less is preferably used.

The powder X-ray diffraction measurement and $^1$H-NMR measurement of the phthalocyanine pigment to be incorporated into the electrophotographic photosensitive member of the present invention were performed under the following conditions.

(Powder X-Ray Diffraction Measurement)

Measurement device used: X-ray diffractometer RINT-TTR II, manufactured by Rigaku Corporation
X-ray tube: Cu
X-ray wavelength: Kα1
Tube voltage: 50 KV
Tube current: 300 mA
Scanning method: 2θ scan
Scanning speed: 4.0°/min
Sampling interval: 0.02°
Start angle 2θ: 5.0°
Stop angle 2θ: 35.0°
Goniometer: rotor horizontal goniometer (TTR-2)
Attachment: capillary rotating sample stage
Filter: not used
Detector: scintillation counter
Incident monochromator: used
Slit: variable slit (parallel beam method)
Counter monochromator: not used
Divergence slit: open
Divergence vertical limit slit: 10.00 mm
Scattering slit: open
Receiving slit: open ($^1$H-NMR Measurement)

Measuring instrument used: AVANCE III 500, manufactured by Bruker Corporation
Solvent: Deuterated sulfuric acid (D2504)
Number of scans: 2,000

<Charge-Transporting Layer>

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably 25 mass % to 70 mass %, more preferably 30 mass % to 55 mass % with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, the charge-transporting layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the charge-transporting layer is preferably 5 μm to 50 μm, more preferably 8 μm to 40 μm, particularly preferably 10 μm to 30 μm.

The charge-transporting layer may be formed by preparing a coating liquid for a charge-transporting layer containing the above-mentioned materials and a solvent, forming a coat thereof, and drying the coat. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

<Protection Layer>

In the present invention, a protection layer may be arranged on the photosensitive layer. When the protection layer is arranged, durability can be improved.

It is preferred that the protection layer contain electroconductive particles and/or a charge-transporting substance and a resin.

Examples of the electroconductive particles include particles of metal oxides, such as titanium oxide, zinc oxide, tin oxide, and indium oxide.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred.

In addition, the protection layer may be formed as a cured film by polymerizing a composition containing a monomer having a polymerizable functional group. As a reaction in this case, there are given, for example, a thermal polymerization reaction, a photopolymerization reaction, and a radiation polymerization reaction. Examples of the polymerizable functional group of the monomer having a polymerizable functional group include an acryloyl group and a methacryloyl group. A material having a charge-transporting ability may be used as the monomer having a polymerizable functional group.

The protection layer may contain an additive, such as an antioxidant, a UV absorber, a plasticizer, a leveling agent, a slipperiness-imparting agent, or a wear resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the protection layer is preferably 0.5 μm to 10 μm, more preferably 1 μm to 7 μm.

The protection layer may be formed by preparing a coating liquid for a protection layer containing the above-mentioned materials and a solvent, forming a coat thereof, and drying and/or curing the coat. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

[Process Cartridge and Electrophotographic Apparatus]

Figure 2:
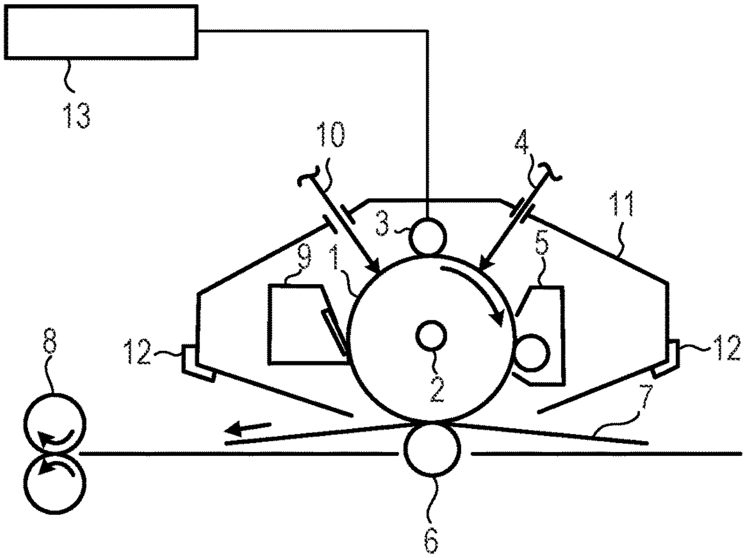
FIG. 2 is a view for illustrating an example of the schematic configuration of an electrophotographic apparatus including a process cartridge including the electrophotographic photosensitive member according to the present invention.

An example of the schematic configuration of an electrophotographic apparatus including a process cartridge including an electrophotographic photosensitive member is illustrated in FIG. 2. In FIG. 2, a cylindrical (drum-shaped) electrophotographic photosensitive member 1 is rotationally driven about a shaft 2 in a direction indicated by the arrow at a predetermined peripheral speed (process speed).

The surface of the electrophotographic photosensitive member 1 is charged to a predetermined positive or negative potential by a charging unit 3 connected to a high-voltage power source 13 of an electrophotographic apparatus in its rotation process. Next, exposure light 4 is applied from an exposing unit (not shown) to the charged surface of the electrophotographic photosensitive member 1 to form an electrostatic latent image corresponding to target image information. The exposure light 4 is light, which is emitted from the exposing unit, such as slit exposure or laser beam scanning exposure, and is subjected to intensity modulation in correspondence with a time-series electric digital image signal of the target image information.

The electrostatic latent image formed on the surface of the electrophotographic photosensitive member 1 is developed (normal development or reversal development) with toner stored in a developing unit 5 to form a toner image on the surface of the electrophotographic photosensitive member 1. The toner image formed on the surface of the electrophotographic photosensitive member 1 is transferred onto a transfer material 7 by a transferring unit 6. At this time, a bias voltage opposite in polarity to charge retained by the toner is applied from a bias power source (not shown) to the transferring unit 6. In addition, when the transfer material 7 is paper, the transfer material 7 is removed from a sheet-feeding portion (not shown), and is fed into a space between the electrophotographic photosensitive member 1 and the transferring unit 6 in sync with the rotation of the electrophotographic photosensitive member 1.

The transfer material 7 onto which the toner image has been transferred from the electrophotographic photosensitive member 1 is separated from the surface of the electrophotographic photosensitive member 1, and is then conveyed to a fixing unit 8 where the transfer material is subjected to treatment for fixing the toner image. Thus, the transfer material is printed out as an image-formed product (a print or a copy) to the outside of the electrophotographic apparatus. The surface of the electrophotographic photosensitive member 1 after the transfer of the toner image onto the transfer material 7 is cleaned by a cleaning unit 9 as follows: a deposit such as the toner (transfer residual toner) is removed from the surface. The transfer residual toner may be directly removed with a developing device or the like by a cleaner-less system that has been recently developed. Further, the surface of the electrophotographic photosensitive member 1 is subjected to electricity-removing treatment by pre-exposure light 10 from a pre-exposing unit (not shown), and is then repeatedly used in image formation. When the charging unit 3 is a contact charging unit using a charging roller or the like, the pre-exposing unit is not necessarily required. In the present invention, a plurality of constituents out of the constituents, such as the electrophotographic photosensitive member 1, the charging unit 3, the developing unit 5, and the cleaning unit 9 described above, are stored in a container and integrally supported to form a process cartridge. The process cartridge may be removably mounted onto the main body of the electrophotographic apparatus. For example, at least one selected from the charging unit 3, the developing unit 5, and the cleaning unit 9 is integrally supported with the electrophotographic photosensitive member 1 to be turned into a cartridge. The cartridge may be a process cartridge 11 removably mounted onto the main body of the electrophotographic apparatus through use of a guiding unit 12 of the main body of the electrophotographic apparatus, such as a rail. When the electrophotographic apparatus is a copying machine or a printer, the exposure light 4 may be reflected light or transmitted light from a manuscript. Alternatively, the exposure light may be light to be radiated by, for example, scanning with a laser beam, the driving of a LED array, or the driving of a liquid crystal shutter array to be performed in accordance with a signal, which is obtained as follows: the manuscript is read with a sensor, and is turned into the signal.

The electrophotographic photosensitive member 1 of the present invention can be widely applied to fields where electrophotography is applied, such as a laser beam printer, a CRT printer, a LED printer, a FAX, a liquid crystal printer, and laser plate making.

EXAMPLES

The present invention is described in more detail below by way of Photosensitive Member Production Examples. The present invention is by no means limited to the following Examples without departing from the gist of the present invention. In the description in the following photosensitive member production examples, "part(s)" is by mass unless otherwise specified.

The thicknesses of the respective layers of electrophotographic photosensitive members of photosensitive member production examples except a charge-generating layer were each determined by a method including using an eddy current-type thickness meter (Fischerscope, manufactured by Fischer Instruments K.K.) or a method including converting the mass of the layer per unit area into the thickness thereof through use of the specific gravity thereof. The thickness of the charge-generating layer is determined through measurement including converting the Macbeth density value of the photosensitive member, which has been measured by pressing a spectral densitometer (product name: X-Rite 504/508, manufactured by X-Rite Inc.) against the surface of the photosensitive member, through use of a calibration curve obtained in advance from the Macbeth density value and the value of the thickness measured by the observation of a sectional SEM image of the layer.

[Preparation Example of Coating Liquid 1 for Undercoat Layer]

100 Parts of rutile-type titanium oxide particles (average primary particle diameter: 50 nm, manufactured by Tayca Corporation) were stirred and mixed with 500 parts of toluene, and 3.0 parts of methyldimethoxysilane ("TSL8117" manufactured by Toshiba Silicone Co., Ltd.) was added to the mixture, followed by stirring for 8 hours. After that, toluene was evaporated by distillation under reduced pressure, and the residue was dried for 3 hours at 120° C. Thus, rutile-type titanium oxide particles whose surfaces had already been treated with methyldimethoxysilane were obtained.

18 Parts of the rutile-type titanium oxide particles whose surfaces had already been treated with methyldimethoxysilane, 4.5 parts of N-methoxymethylated nylon (product name: TORESIN EF-30T, manufactured by Nagase ChemteX Corporation), and 1.5 parts of a copolymerized nylon resin (product name: AMILAN CM8000, manufactured by Toray Industries, Inc.) were added to a mixed solvent of 90 parts of methanol and 60 parts of 1-butanol to prepare a dispersion liquid. The dispersion liquid was subjected to dispersion treatment in a vertical sand mill using glass beads each having a diameter of 1.0 mm for 6 hours. The liquid subjected to the sand mill dispersion treatment as described above was then further subjected to dispersion treatment in an ultrasonic disperser (UT-205, manufactured by Sharp Corporation) for 1 hour to prepare a coating liquid 1 for an undercoat layer. The output of the ultrasonic disperser was set to 100%. In addition, in the milling treatment, media such as glass beads were not used.

[Preparation Example of Coating Liquid 2 for Undercoat Layer]

A coating liquid 2 for an undercoat layer was prepared in the same manner as in the coating liquid 1 for an undercoat layer except that in the preparation example of the coating liquid 1 for an undercoat layer, the sand mill dispersion treatment time was changed to 4 hours.

[Preparation Example of Coating Liquid 3 for Undercoat Layer]

100 Parts of rutile-type titanium oxide particles (average primary particle diameter: 15 nm, manufactured by Tayca Corporation) were stirred and mixed with 500 parts of toluene, and 9.6 parts of methyldimethoxysilane ("TSL8117" manufactured by Toshiba Silicone Co., Ltd.) was added to the mixture, followed by stirring for 8 hours. After that, toluene was evaporated by distillation under reduced pressure, and the residue was dried for 3 hours at 120° C. Thus, rutile-type titanium oxide particles whose surfaces had already been treated with methyldimethoxysilane were obtained.

6 Parts of the rutile-type titanium oxide particles whose surfaces had already been treated with methyldimethoxysilane, 4.5 parts of N-methoxymethylated nylon (product name: TORESIN EF-30T, manufactured by Nagase ChemteX Corporation), and 1.5 parts of a copolymerized nylon resin (product name: AMILAN CM8000, manufactured by Toray Industries, Inc.) were added to a mixed solvent of 90 parts of methanol and 60 parts of 1-butanol to prepare a dispersion liquid. The dispersion liquid was subjected to dispersion treatment in a vertical sand mill using glass beads each having a diameter of 1.0 mm for 6 hours. The liquid subjected to the sand mill dispersion treatment as described above was then further subjected to dispersion treatment in an ultrasonic disperser (UT-205, manufactured by Sharp Corporation) for 1 hour to prepare a coating liquid 3 for an undercoat layer. The output of the ultrasonic disperser was set to 100%. In addition, in the milling treatment, media such as glass beads were not used.

[Preparation Example of Coating Liquid 4 for Undercoat Layer]

A coating liquid 4 for an undercoat layer was prepared in the same manner as in the coating liquid 3 for an undercoat layer except that in the preparation example of the coating liquid 3 for an undercoat layer, the sand mill dispersion treatment time was changed to 4 hours.

[Preparation Example of Coating Liquid 5 for Undercoat Layer]

100 Parts of rutile-type titanium oxide particles (average primary particle diameter: 35 nm, manufactured by Tayca Corporation) were stirred and mixed with 500 parts of toluene, and 4.32 parts of methyldimethoxysilane ("TSL8117" manufactured by Toshiba Silicone Co., Ltd.) was added to the mixture, followed by stirring for 8 hours. After that, toluene was evaporated by distillation under reduced pressure, and the residue was dried for 3 hours at 120° C. Thus, rutile-type titanium oxide particles whose surfaces had already been treated with methyldimethoxysilane were obtained.

12 Parts of the rutile-type titanium oxide particles whose surfaces had already been treated with methyldimethoxysilane, 4.5 parts of N-methoxymethylated nylon (product name: TORESIN EF-30T, manufactured by Nagase ChemteX Corporation), and 1.5 parts of a copolymerized nylon resin (product name: AMILAN CM8000, manufactured by Toray Industries, Inc.) were added to a mixed solvent of 90 parts of methanol and 60 parts of 1-butanol to prepare a dispersion liquid. The dispersion liquid was subjected to dispersion treatment in a vertical sand mill using glass beads each having a diameter of 1.0 mm for 6 hours. The liquid subjected to the sand mill dispersion treatment as described above was then further subjected to dispersion treatment in an ultrasonic disperser (UT-205, manufactured by Sharp Corporation) for 1 hour to prepare a coating liquid 5 for an undercoat layer. The output of the ultrasonic disperser was set to 100%. In addition, in the milling treatment, media such as glass beads were not used.

[Preparation Example of Coating Liquid 6 for Undercoat Layer]

A coating liquid 6 for an undercoat layer was prepared in the same manner as in the coating liquid 5 for an undercoat layer except that in the preparation example of the coating liquid 5 for an undercoat layer, the sand mill dispersion treatment time was changed to 4 hours.

[Preparation Example of Coating Liquid 7 for Undercoat Layer]

100 Parts of rutile-type titanium oxide particles (average primary particle diameter: 80 nm, manufactured by Tayca Corporation) were stirred and mixed with 500 parts of toluene, and 1.8 parts of methyldimethoxysilane ("TSL8117" manufactured by Toshiba Silicone Co., Ltd.) was added to the mixture, followed by stirring for 8 hours. After that, toluene was evaporated by distillation under reduced pressure, and the residue was dried for 3 hours at 120° C. Thus, rutile-type titanium oxide particles whose surfaces had already been treated with methyldimethoxysilane were obtained.

18 Parts of the rutile-type titanium oxide particles whose surfaces had already been treated with methyldimethoxysilane, 4.5 parts of N-methoxymethylated nylon (product name: TORESIN EF-30T, manufactured by Nagase ChemteX Corporation), and 1.5 parts of a copolymerized nylon resin (product name: AMILAN CM8000, manufactured by Toray Industries, Inc.) were added to a mixed solvent of 90 parts of methanol and 60 parts of 1-butanol to prepare a dispersion liquid. The dispersion liquid was subjected to dispersion treatment in a vertical sand mill using glass beads each having a diameter of 1.0 mm for 6 hours. The liquid subjected to the sand mill dispersion treatment as described above was then further subjected to dispersion treatment in an ultrasonic disperser (UT-205, manufactured by Sharp Corporation) for 1 hour to prepare a coating liquid 7 for an undercoat layer. The output of the ultrasonic disperser was set to 100%. In addition, in the milling treatment, media such as glass beads were not used.

[Preparation Example of Coating Liquid 8 for Undercoat Layer]

A coating liquid 8 for an undercoat layer was prepared in the same manner as in the coating liquid 7 for an undercoat layer except that in the preparation example of the coating liquid 7 for an undercoat layer, the sand mill dispersion treatment time was changed to 4 hours.

[Preparation Example of Coating Liquid 9 for Undercoat Layer]

100 Parts of rutile-type titanium oxide particles (average primary particle diameter: 120 nm, manufactured by Tayca Corporation) were stirred and mixed with 500 parts of toluene, and 1.8 parts of methyldimethoxysilane ("TSL8117" manufactured by Toshiba Silicone Co., Ltd.) was added to the mixture, followed by stirring for 8 hours. After that, toluene was evaporated by distillation under reduced pressure, and the residue was dried for 3 hours at 120° C. Thus, rutile-type titanium oxide particles whose surfaces had already been treated with methyldimethoxysilane were obtained.

18 Parts of the rutile-type titanium oxide particles whose surfaces had already been treated with methyldimethoxysilane, 4.5 parts of N-methoxymethylated nylon (product name: TORESIN EF-30T, manufactured by Nagase ChemteX Corporation), and 1.5 parts of a copolymerized nylon resin (product name: AMILAN CM8000, manufactured by Toray Industries, Inc.) were added to a mixed solvent of 90 parts of methanol and 60 parts of 1-butanol to prepare a dispersion liquid. The dispersion liquid was subjected to dispersion treatment in a vertical sand mill using glass beads each having a diameter of 1.0 mm for 6 hours. The liquid subjected to the sand mill dispersion treatment as described above was then further subjected to dispersion treatment in an ultrasonic disperser (UT-205, manufactured by Sharp Corporation) for 1 hour to prepare a coating liquid 9 for an undercoat layer. The output of the ultrasonic disperser was set to 100%. In addition, in the milling treatment, media such as glass beads were not used.

[Preparation Example of Coating Liquid 10 for Undercoat Layer]

A coating liquid 10 for an undercoat layer was prepared in the same manner as in the coating liquid 1 for an undercoat layer except that in the preparation example of the coating liquid 1 for an undercoat layer, methyldimethoxysilane was changed to vinyltrimethoxysilane (product name: KBM-1003, manufactured by Shin-Etsu Chemical Co., Ltd.).

[Preparation Example of Coating Liquid 11 for Undercoat Layer]

A coating liquid 11 for an undercoat layer was prepared in the same manner as in the coating liquid 10 for an undercoat layer except that in the preparation example of the coating liquid 10 for an undercoat layer, the sand mill dispersion treatment time was changed to 4 hours.

[Preparation Example of Coating Liquid 12 for Undercoat Layer]

18 Parts of rutile-type titanium oxide particles (average primary particle diameter: 50 nm, manufactured by Tayca Corporation), 4.5 parts of N-methoxymethylated nylon (product name: TORESIN EF-30T, manufactured by Nagase ChemteX Corporation), and 1.5 parts of a copolymerized nylon resin (product name: AMILAN CM8000, manufactured by Toray Industries, Inc.) were added to a mixed solvent of 90 parts of methanol and 60 parts of 1-butanol to prepare a dispersion liquid. The dispersion liquid was subjected to dispersion treatment in a vertical sand mill using glass beads each having a diameter of 1.0 mm for 6 hours. The liquid subjected to the sand mill dispersion treatment as described above was then further subjected to dispersion treatment in an ultrasonic disperser (UT-205, manufactured by Sharp Corporation) for 1 hour to prepare a coating liquid 12 for an undercoat layer. The output of the ultrasonic disperser was set to 100%. In addition, in the milling treatment, media such as glass beads were not used.

[Preparation Example of Coating Liquid 13 for Undercoat Layer]

18 Parts of rutile-type titanium oxide particles (average primary particle diameter: 120 nm, manufactured by Tayca Corporation), 4.5 parts of N-methoxymethylated nylon (product name: TORESIN EF-30T, manufactured by Nagase ChemteX Corporation), and 1.5 parts of a copolymerized nylon resin (product name: AMILAN CM8000, manufactured by Toray Industries, Inc.) were added to a mixed solvent of 90 parts of methanol and 60 parts of 1-butanol to prepare a dispersion liquid. The dispersion liquid was subjected to dispersion treatment in a vertical sand mill using glass beads each having a diameter of 1.0 mm for 6 hours. The liquid subjected to the sand mill dispersion treatment as described above was then further subjected to dispersion treatment in an ultrasonic disperser (UT-205, manufactured by Sharp Corporation) for 1 hour to prepare a coating liquid 13 for an undercoat layer. The output of the ultrasonic disperser was set to 100%. In addition, in the milling treatment, media such as glass beads were not used.

[Preparation Example of Coating Liquid 14 for Undercoat Layer]

A coating liquid 14 for an undercoat layer was prepared in the same manner as in the coating liquid 10 for an undercoat layer except that in the preparation example of the coating liquid 10 for an undercoat layer, the rutile-type titanium oxide particles were changed to rutile-type titanium oxide particles (average primary particle diameter: 100 nm, manufactured by Tayca Corporation).

[Synthesis of Phthalocyanine Pigment]

Synthesis Example 1

Under a nitrogen flow atmosphere, 5.46 parts of orthophthalonitrile and 45 parts of α-chloronaphthalene were loaded into a reaction vessel. After that, the temperature of the mixture was increased to 30° C. by its heating, and the temperature was maintained. Next, 3.75 parts of gallium trichloride was loaded into the vessel at the temperature (30° C.). The moisture concentration of the mixed liquid at the time of the loading was 150 ppm. After that, the temperature was increased to 200° C. Next, under a nitrogen flow atmosphere, the resultant was subjected to a reaction at a temperature of 200° C. for 4.5 hours, and was then cooled. When the temperature reached 150° C., the product was filtered. The resultant filtration residue was dispersed in and washed with N,N-dimethylformamide at a temperature of 140° C. for 2 hours, and was then filtered. The resultant filtration residue was washed with methanol, and was then dried to provide a chlorogallium phthalocyanine pigment in a yield of 71%.

Synthesis Example 2

4.65 Parts of the chlorogallium phthalocyanine pigment obtained in Synthesis Example 1 above was dissolved in 139.5 parts of concentrated sulfuric acid at a temperature of 10° C. The solution was dropped into 620 parts of ice water under stirring to be reprecipitated. The precipitate was filtered under reduced pressure with a filter press. At this time, No. 5C (manufactured by Advantec) was used as a filter. The resultant wet cake (filtration residue) was dispersed in and washed with 2% ammonia water for 30 minutes, and was then filtered with the filter press. Next, the resultant wet cake (filtration residue) was dispersed in and washed with ion-exchanged water, and was then repeatedly filtered with the filter press three times. Finally, the resultant was freeze-dried to provide a hydroxygallium phthalocyanine pigment (water-containing hydroxygallium phthalocyanine pigment) having a solid content of 23% in a yield of 97%.

Synthesis Example 3

6.6 Kilograms of the hydroxygallium phthalocyanine pigment obtained in Synthesis Example 2 above was dried with a hyper-dry dryer (product name: HD-06R, frequency (oscillation frequency): 2,455 MHz±15 MHz, manufactured by Biocon (Japan) Ltd.) as described below.

The hydroxygallium phthalocyanine pigment was placed under the state of a lump (water-containing cake thickness: 4 cm or less) immediately after its removal from the filter press on a dedicated circular plastic tray, and the dryer was set so that far infrared rays were turned off, and the temperature of the inner wall of the dryer became 50° C. Then, when the pigment was irradiated with a microwave, the vacuum pump and leak valve of the dryer were adjusted to adjust the vacuum degree thereof to from 4.0 kPa to 10.0 kPa.

First, as a first step, the hydroxygallium phthalocyanine pigment was irradiated with a microwave having an output of 4.8 kW for 50 minutes. Next, the microwave was temporarily turned off, and the leak valve was temporarily closed to achieve a high vacuum of 2 kPa or less. The solid content of the hydroxygallium phthalocyanine pigment at this time point was 88%. As a second step, the leak valve was adjusted to adjust the vacuum degree (pressure in the dryer) within the above-mentioned preset values (from 4.0 kPa to 10.0 kPa). After that, the hydroxygallium phthalocyanine pigment was irradiated with a microwave having an output of 1.2 kW for 5 minutes. In addition, the microwave was temporarily turned off, and the leak valve was temporarily closed to achieve a high vacuum of 2 kPa or less. The second step was repeated once more (twice in total). The solid content of the hydroxygallium phthalocyanine pigment at this time point was 98%. Further, as a third step, microwave irradiation was performed in the same manner as in the second step except that the output of the microwave in the second step was changed from 1.2 kW to 0.8 kW. The third step was repeated once more (twice in total). Further, as a fourth step, the leak valve was adjusted to return the vacuum degree (pressure in the dryer) within the above-mentioned preset values (from 4.0 kPa to 10.0 kPa). After that, the hydroxygallium phthalocyanine pigment was irradiated with a microwave having an output of 0.4 kW for 3 minutes. In addition, the microwave was temporarily turned off, and the leak valve was temporarily closed to achieve a high vacuum of 2 kPa or less. The fourth step was repeated seven more times (eight times in total). Thus, 1.52 kg of a hydroxygallium phthalocyanine pigment (crystal) having a water content of 1% or less was obtained within a total of 3 hours.

Synthesis Example 4

In 100 g of α-chloronaphthalene, 5.0 g of o-phthalodinitrile and 2.0 g of titanium tetrachloride were heated and stirred at 200° C. for 3 hours, and were then cooled to 50° C. to precipitate a crystal. The crystal was separated by filtration to provide a paste of dichlorotitanium phthalocyanine. Next, the paste was stirred and washed with 100 mL of N,N-dimethylformamide heated to 100° C., and was then washed repeatedly twice with 100 mL of methanol at 60° C. and separated by filtration. Further, the resultant paste was stirred at 80° C. for 1 hour in 100 mL of deionized water, and was separated by filtration to provide 4.3 g of a blue titanyl phthalocyanine pigment.

Next, the pigment was dissolved in 30 mL of concentrated sulfuric acid. The solution was dropped into 300 mL of deionized water at 20° C. under stirring to be reprecipitated. The precipitate was filtered and sufficiently washed with water to provide an amorphous titanyl phthalocyanine pigment. 4.0 Grams of the amorphous titanyl phthalocyanine pigment was suspended and stirred in 100 mL of methanol at room temperature (22° C.) for 8 hours. The resultant was separated by filtration and dried under reduced pressure to provide a titanyl phthalocyanine pigment having low crystallinity.

Synthesis Example 5

Under a nitrogen flow atmosphere, 10 g of gallium trichloride and 29.1 g of orthophthalonitrile were added to 100 mL of α-chloronaphthalene, and the mixture was subjected to a reaction at a temperature of 200° C. for 24 hours. After that, the product was filtered. The resultant wet cake was stirred in N,N-dimethylformamide under heating at a temperature of 150° C. for 30 minutes, and then the mixture was filtered. The resultant filtration residue was washed with methanol, and was then dried to provide a chlorogallium phthalocyanine pigment in a yield of 83%.

2 Parts of the chlorogallium phthalocyanine pigment obtained by the above-mentioned method was dissolved in 50 parts of concentrated sulfuric acid, and the solution was stirred for 2 hours. After that, the solution was dropped into a mixed solution of 170 mL of distilled water and 66 mL of concentrated ammonia water, which had been cooled with ice, to be reprecipitated. The precipitate was sufficiently washed with distilled water, and was dried to provide 1.8 parts of a hydroxygallium phthalocyanine pigment.

[Preparation Example of Coating Liquid 1 for Charge-generating Layer]

1 Part of the hydroxygallium phthalocyanine pigment obtained in Synthesis Example 3, 9 parts of N-methylformamide (product code: F0059, manufactured by Tokyo Chemical Industry Co., Ltd.), and 15 parts of glass beads each having a diameter of 0.9 mm were subjected to milling treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 70 hours. At this time, the treatment was performed under such a condition that the discs were rotated 400 times per minute. 30 Parts of N-methylformamide was added to the liquid thus treated. After that, the mixture was filtered, and a filtration residue on a filter was sufficiently washed with tetrahydrofuran. Then, the washed filtration residue was dried in a vacuum to provide 0.45 part of a hydroxygallium phthalocyanine pigment.

The resultant pigment has peaks at Bragg angles 2θ° of 7.5°±0.2°, 9.9°±0.2°, 16.2°±0.2°, 18.6°±0.2°, 25.2°±0.2°, and 28.3°±0.2° in an X-ray diffraction spectrum using a CuKα ray. A crystal correlation length "r" estimated from the peak at 7.5°±0.2° that was a diffraction peak having the highest intensity in the range of from 5° to 35° was 27 [nm]. In addition, the content of an amide compound (N-methylformamide) represented by the formula (A1) in the hydroxygallium phthalocyanine crystal particles, which was estimated by $^1$H-NMR measurement, was 1.5 mass % with respect to the content of the hydroxygallium phthalocyanine.

Subsequently, 25 parts of the hydroxygallium phthalocyanine pigment obtained by the milling treatment, 5 parts of polyvinyl butyral (product name: S-LEC BX-1, manufactured by Sekisui Chemical Co., Ltd.), and 190 parts of cyclohexanone were loaded into a container for centrifugation, and were subjected to centrifugation treatment with a high-speed refrigerated centrifuge (product name: himac CR22G, manufactured by Hitachi Koki Co., Ltd.) under a preset temperature of 18° C. for 30 minutes. At this time, the treatment was performed under the following conditions: a product available under the product name "R14A" (manufactured by Hitachi Koki Co., Ltd.) was used as a rotor; the rotor was accelerated and decelerated within the shortest time period; and the rotor was rotated 1,800 times per minute. The supernatant liquid after the centrifugation was immediately collected in another container for centrifugation. The solution thus obtained was subjected to centrifugation treatment again in the same manner as that described above except that the treatment was performed under such a condition that the rotor was rotated 8,000 times per minute. A solution remaining after the removal of the supernatant liquid after the centrifugation was immediately collected in another sample bottle. A weight ratio between the hydroxygallium phthalocyanine pigment and polyvinyl butyral in the solution thus obtained was determined by $^1$H-NMR measurement. In addition, the solid content of the resultant solution was determined by a method including: drying the solution with a dryer set to 150° C. for 30 minutes; and measuring a difference between its weights before and after the drying.

Subsequently, polyvinyl butyral (product name: S-LEC BX-1, manufactured by Sekisui Chemical Co., Ltd.) and cyclohexanone were added to the solution obtained by the centrifugation treatment so that a weight ratio among the hydroxygallium phthalocyanine pigment, polyvinyl butyral, and cyclohexanone became 20:10:190. 220 Parts of the solution and 482 parts of glass beads each having a diameter of 0.9 mm were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. 444 Parts of cyclohexanone and 634 parts of ethyl acetate were added to the dispersion liquid to prepare a coating liquid 1 for a charge-generating layer.

The crystal particle size distribution of the phthalocyanine pigment in the present invention measured by small-angle X-ray scattering was evaluated in accordance with the following procedure.

Cyclohexanone was added to the prepared coating liquid 1 for a charge-generating layer to dilute the liquid until the concentration of its charge-generating material became 1 wt %. Thus, a measurement sample was obtained.

The scattering profile of the sample was determined by performing small-angle X-ray scattering measurement (X-ray wavelength: 0.154 nm) with a multipurpose X-ray diffractometer SmartLab manufactured by Rigaku Corporation.

The scattering profile obtained by the measurement was analyzed with particle diameter analysis software NANO-Solver to provide the particle size distribution. It was hypothesized that the particles of the charge-generating material each had a spherical shape.

As a result of the measurement, the resultant pigment had a peak at a position of 38 nm in the crystal particle size distribution measured by using the small-angle X-ray scattering, and the peak had a half-width of 38 nm.

[Preparation Example of Coating Liquid 2 for Charge-Generating Layer]

A coating liquid 2 for a charge-generating layer was prepared in the same manner as in the coating liquid 1 for a charge-generating layer. The resultant pigment had a peak at a position of 30 nm in its crystal particle size distribution measured by using small-angle X-ray scattering, and the peak had a half-width of 40 nm.

[Preparation Example of Coating Liquid 3 for Charge-Generating Layer]

A coating liquid 3 for a charge-generating layer was prepared in the same manner as in the coating liquid 1 for a charge-generating layer. The resultant pigment had a peak at a position of 42 nm in its crystal particle size distribution measured by using small-angle X-ray scattering, and the peak had a half-width of 50 nm.

[Preparation Example of Coating Liquid 4 for Charge-Generating Layer]

A coating liquid 4 for a charge-generating layer was prepared in the same manner as in the coating liquid 1 for a charge-generating layer. The resultant pigment had a peak at a position of 48 nm in its crystal particle size distribution measured by using small-angle X-ray scattering, and the peak had a half-width of 46 nm.

[Preparation Example of Coating Liquid 10 for Charge-Generating Layer]

0.5 Part of the titanyl phthalocyanine pigment obtained in Synthesis Example 4, 10 parts of tetrahydrofuran, and 15 parts of glass beads each having a diameter of 0.9 mm were subjected to milling treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 48 hours. At this time, the treatment was performed under such a condition that the discs were rotated 500 times per minute. The glass beads were removed by filtering the liquid thus treated with a filter (product number: N-NO. 125T, pore diameter: 133 μm, manufactured by NBC Meshtec Inc.). 30 Parts of tetrahydrofuran was added to the resultant liquid, and then the mixture was filtered, followed by sufficient washing of the filtration residue on the filter with methanol and water. Then, the washed filtration residue was dried in a vacuum to provide 0.46 part of a titanyl phthalocyanine pigment. The resultant pigment has a peak at Bragg angles 2θ° of 27.2°±0.2° in an X-ray diffraction spectrum using a CuKα ray.

Subsequently, 20 parts of the titanyl phthalocyanine pigment obtained by the milling treatment, 10 parts of polyvinyl butyral (product name: S-LEC BX-1, manufactured by Sekisui Chemical Co., Ltd.), 139 parts of cyclohexanone, and 354 parts of glass beads each having a diameter of 0.9 mm were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. 326 Parts of cyclohexanone and 465 parts of ethyl acetate were added to the dispersion liquid to prepare a coating liquid 10 for a charge-generating layer. The resultant pigment had a peak at a position of 70 nm in its crystal particle size distribution measured by using small-angle X-ray scattering, and the peak had a half-width of 90 nm.

[Preparation Example of Coating Liquid 11 for Charge-Generating Layer]

15 Parts of a titanyl phthalocyanine pigment (CG-01H, manufactured by IT-Chem Co., Ltd.), 10 parts of polyvinyl butyral (product name: S-LEC BX-1, manufactured by Sekisui Chemical Co., Ltd.), 139 parts of cyclohexanone, and 354 parts of glass beads each having a diameter of 0.9 mm were subjected to dispersion treatment with a sand mill (K-800, manufactured by Igarashi Machine Production Co., Ltd. (currently changed to Aimex Co., Ltd.), disc diameter: 70 mm, number of discs: 5) under a cooling water temperature of 18° C. for 4 hours. At this time, the treatment was performed under such a condition that the discs were rotated 1,800 times per minute. 326 Parts of cyclohexanone and 465 parts of ethyl acetate were added to the dispersion liquid to prepare a coating liquid 11 for a charge-generating layer. The resultant pigment had a peak at a position of 160 nm in its crystal particle size distribution measured by using small-angle X-ray scattering, and the peak had a half-width of 200 nm.

[Preparation Example of Coating Liquid 12 for Charge-Generating Layer]

A coating liquid 12 for a charge-generating layer was prepared in the same manner as in the coating liquid 1 for a charge-generating layer. The resultant pigment had a peak at a position of 60 nm in its crystal particle size distribution measured by using small-angle X-ray scattering, and the peak had a half-width of 80 nm.

[Preparation Example of Coating Liquid 13 for Charge-Generating Layer]

A coating liquid 13 for a charge-generating layer was prepared in the same manner as in the coating liquid 1 for a charge-generating layer. The resultant pigment had a peak at a position of 145 nm in its crystal particle size distribution measured by using small-angle X-ray scattering, and the peak had a half-width of 98 nm.

[Photosensitive Member Production Example 1]

<Support>

An aluminum cylinder having a diameter of 30 mm and a length of 260.5 mm was used as a support (cylindrical support).

<Electroconductive Layer>

Anatase-type titanium oxide having an average primary particle diameter of 200 nm was used as a base, and a titanium-niobium sulfuric acid solution containing 33.7 parts of titanium in terms of $TiO_2$ and 2.9 parts of niobium in terms of $Nb_2O_5$ was prepared. 100 Parts of the base was dispersed in pure water to provide 1,000 parts of a suspension, and the suspension was warmed to 60° C. The titanium-niobium sulfuric acid solution and 10 mol/L sodium hydroxide were dropped into the suspension over 3 hours so that the pH of the suspension became from 2 to 3. After the total amount of the solutions had been dropped, the pH was adjusted to a value near a neutral region, and a polyacrylamide-based flocculant was added to the mixture to sediment a solid content. The supernatant was removed, and the residue was filtered and washed, followed by drying at 110° C. Thus, an intermediate containing 0.1 wt % of organic matter derived from the flocculant in terms of C was obtained. The intermediate was calcined in nitrogen at 750° C. for 1 hour, and was then calcined in air at 450° C. to produce titanium oxide particles. The resultant particles had an average particle diameter (average primary particle diameter) of 220 nm in the above-mentioned particle diameter measurement method including using a scanning electron microscope.

Subsequently, 50 parts of a phenol resin (monomer/oligomer of a phenol resin) (product name: PLYOPHEN J-325, manufactured by DIC Corporation, resin solid content: 60%, density after curing: 1.3 g/cm$^3$) serving as a binding material was dissolved in 35 parts of 1-methoxy-2-propanol serving as a solvent to provide a solution.

60 Parts of titanium oxide particles 1 were added to the solution. The mixture was loaded into a vertical sand mill using 120 parts of glass beads having an average particle diameter of 1.0 mm as a dispersing medium, and was subjected to dispersion treatment under the conditions of a dispersion liquid temperature of 23° C.±3° C. and a number of revolutions of 1,500 rpm (peripheral speed: 5.5 m/s) for 4 hours to provide a dispersion liquid. The glass beads were removed from the dispersion liquid with a mesh. 0.01 Part of a silicone oil (product name: SH28 PAINT ADDITIVE, manufactured by Dow Corning Toray Co., Ltd.) serving as a leveling agent and 8 parts of silicone resin particles (product name: KMP-590, manufactured by Shin-Etsu Chemical Co., Ltd., average particle diameter: 2 μm, density: 1.3 g/cm$^3$) serving as a surface roughness-imparting material were added to the dispersion liquid after the removal of the glass beads, and the mixture was stirred. The mixture was filtered under pressure with PTFE filter paper (product name: PF060, manufactured by Advantec Toyo Kaisha, Ltd.) to prepare a coating liquid for an electroconductive layer.

The coating liquid for an electroconductive layer thus prepared was applied onto the above-mentioned support by dip coating to form a coat, and the coat was cured by heating at 150° C. for 20 minutes to form an electroconductive layer having a thickness of 17 μm.

<Undercoat Layer>

The coating liquid for an undercoat layer prepared in accordance with the preparation example of the coating liquid 1 for an undercoat layer was applied onto the above-mentioned electroconductive layer by dip coating to form a coat, and the coat was dried by heating at a temperature of 100° C. for 10 minutes to form an undercoat layer having a thickness of 2 μm. The arithmetic average roughness Ra of the resultant undercoat layer in JIS B0601:2001, and the average length Rsm of the roughness curve elements thereof and a ratio Ra/Rsm are shown in Table 1.

The surface roughness of the undercoat layer in the present invention was evaluated in accordance with the following procedure.

The charge-transporting layer of the produced photosensitive drum was dissolved in toluene, and the residue was dried. Thus, the surface of the charge-generating layer thereof was exposed. Next, the exposed charge-generating layer of the photosensitive drum was dissolved in cyclohexanone, and the residue was dried. Thus, the surface of the undercoat layer thereof was exposed. Further, the photosensitive member in which the surface of the undercoat layer had been exposed was cut into a square shape about 5 mm on a side, and the square shape was used as a measurement sample.

Height information was obtained with a scanning probe microscope JSPM-5200 manufactured by JEOL Ltd. in a square region 500 nm on a side on the surface of the undercoat layer. A cantilever NCR manufactured by NanoWorld was used in the measurement, and the height information was obtained by scanning the surface with the cantilever in a tapping mode. The arithmetic average roughness Ra in JIS B0601:2001, and the average length Rsm of the roughness curve elements and the ratio Ra/Rsm were calculated from the obtained height information.

<Charge-Generating Layer>

The coating liquid for a charge-generating layer prepared in accordance with the preparation example of the coating liquid 1 for a charge-generating layer was applied onto the above-mentioned undercoat layer by dip coating to form a coat, and the coat was dried by heating at a temperature of 100° C. for 10 minutes to form a charge-generating layer having a thickness of 0.2

<Charge-Transporting Layer>

5 Parts of a triarylamine compound represented by the following formula:

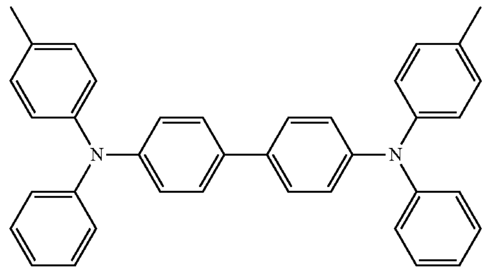 [SMILES: Cc1ccc(N(c2ccccc2)c2ccc(-c3ccc(N(c4ccccc4)c4ccc(C)cc4)cc3)cc2)cc1]

and 5 parts of a triarylamine compound represented by the following formula, the compounds serving as charge-transporting substances:

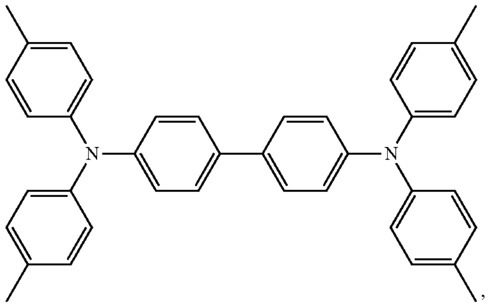 [SMILES: Cc1ccc(N(c2ccc(C)cc2)c2ccc(-c3ccc(N(c4ccc(C)cc4)c4ccc(C)cc4)cc3)cc2)cc1]

, and 10 parts of polycarbonate (product name: IUPILON Z-400, manufactured by Mitsubishi Engineering-Plastics Corporation) were dissolved in a mixed solvent of 25 parts of orthoxylene, 25 parts of methyl benzoate, and 25 parts of dimethoxymethane to prepare a coating liquid for a charge-transporting layer.

The coating liquid for a charge-transporting layer thus prepared was applied onto the above-mentioned charge-generating layer by dip coating to form a coat, and the coat was dried by heating at a temperature of 120° C. for 30 minutes to form a charge-transporting layer having a thickness of 17

[Photosensitive Member Production Examples 2 to 21]

Electrophotographic photosensitive members were each produced in the same manner as in Photosensitive Member Production Example 1 except that in Photosensitive Member Production Example 1, the coating liquid for an undercoat layer and the thickness of the undercoat layer, and the coating liquid for a charge-generating layer and the thickness of the charge-generating layer were changed as shown in Table 1. The arithmetic average roughness Ra of each of the resultant undercoat layers in JIS B0601:2001, and the average length Rsm of the roughness curve elements thereof and a ratio Ra/Rsm are shown in Table 1.

The terms "HOGaPC" and "TiOPc" in the table mean a "hydroxygallium phthalocyanine pigment" and a "titanyl phthalocyanine pigment," respectively.

Comparative Production Example

<Support>

An aluminum cylinder having a diameter of 30 mm and a length of 260.5 mm, which had been subjected to cutting treatment, was used as a support (cylindrical support).

<Undercoat Layer>

The coating liquid for an undercoat layer prepared in accordance with the preparation example of the coating liquid 13 for an undercoat layer was applied onto the same electroconductive layer as in Photosensitive Member Production Example 1 by dip coating to form a coat, and the coat was dried by heating at a temperature of 100° C. for 10 minutes to form an undercoat layer having a thickness of 3.7

<Charge-Generating Layer>

The coating liquid for a charge-generating layer prepared in accordance with the preparation example of the coating liquid 11 for a charge-generating layer was applied onto the above-mentioned undercoat layer by dip coating to form a coat, and the coat was dried by heating at a temperature of 100° C. for 10 minutes to form a charge-generating layer having a thickness of 0.2

<Charge-Transporting Layer>

23 Parts of a triarylamine compound represented by the following formula:

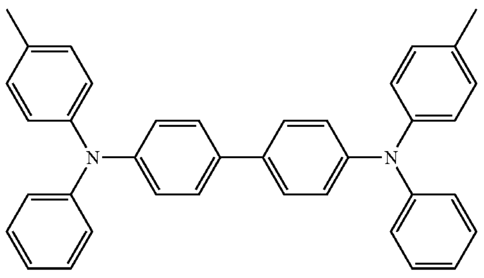 [SMILES: Cc1ccc(N(c2ccccc2)c2ccc(-c3ccc(N(c4ccccc4)c4ccc(C)cc4)cc3)cc2)cc1]

23 parts of a triarylamine compound represented by the following formula:

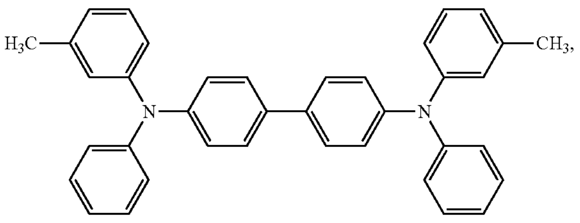 [SMILES: Cc1cccc(N(c2ccccc2)c2ccc(-c3ccc(N(c4ccccc4)c4cccc(C)c4)cc3)cc2)c1]

and 15 parts of an arylamine compound represented by the following formula, the compounds serving as charge-transporting substances:

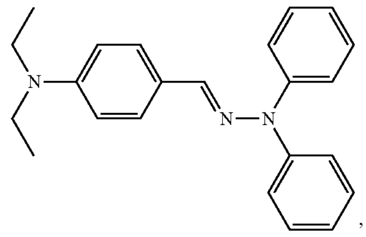 [SMILES: CCN(CC)c1ccc(/C=N/N(c2ccccc2)c2ccccc2)cc1]
, 5 parts of a phenol compound represented by the following formula:

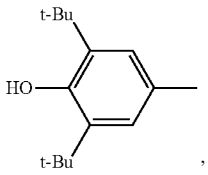 [SMILES: Cc1cc(C(C)(C)C)c(O)c(C(C)(C)C)c1]
, 8 parts of a phenol compound represented by the following formula:

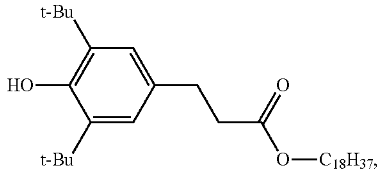

and 10 parts of polycarbonate (product name: IUPILON Z-400, manufactured by Mitsubishi Engineering-Plastics Corporation) were dissolved in a mixed solvent of 25 parts of orthoxylene, 25 parts of methyl benzoate, and 25 parts of dimethoxymethane to prepare a coating liquid for a charge-transporting layer.

The coating liquid for a charge-transporting layer thus prepared was applied onto the above-mentioned charge-generating layer by dip coating to form a coat, and the coat was dried by heating at a temperature of 120° C. for 30 minutes to form a charge-transporting layer having a thickness of 17 μm.

TABLE 1

| Photosensitive Member Production Example No. | Undercoat layer Coating liquid No. | Average primary particle diameter of titanium oxide particles (nm) | Surface-modifying compound of titanium oxide particles | Thickness (μm) | Ra/Rsm | Ra (nm) |
|---|---|---|---|---|---|---|
| 1 | 1 | 50 | Methyldimethoxymethane | 2 | 0.23 | 25 |
| 2 | 1 | 50 | Methyldimethoxymethane | 2 | 0.23 | 25 |
| 3 | 1 | 50 | Methyldimethoxymethane | 2 | 0.23 | 25 |
| 4 | 1 | 50 | Methyldimethoxymethane | 2 | 0.23 | 25 |
| 5 | 1 | 50 | Methyldimethoxymethane | 2 | 0.23 | 25 |
| 6 | 1 | 50 | Methyldimethoxymethane | 2 | 0.23 | 25 |
| 7 | 1 | 50 | Methyldimethoxymethane | 2 | 0.23 | 25 |
| 8 | 2 | 50 | Methyldimethoxymethane | 2 | 0.29 | 35 |
| 9 | 3 | 15 | Methyldimethoxymethane | 1.5 | 0.20 | 15 |
| 10 | 4 | 15 | Methyldimethoxymethane | 1.5 | 0.26 | 20 |
| 11 | 5 | 35 | Methyldimethoxymethane | 2 | 0.20 | 20 |
| 12 | 6 | 35 | Methyldimethoxymethane | 2 | 0.27 | 30 |
| 13 | 7 | 80 | Methyldimethoxymethane | 2.5 | 0.25 | 30 |
| 14 | 8 | 80 | Methyldimethoxymethane | 2.5 | 0.31 | 40 |
| 15 | 9 | 120 | Methyldimethoxymethane | 2.5 | 0.33 | 45 |
| 16 | 2 | 50 | Methyldimethoxymethane | 0.3 | 0.46 | 55 |
| 17 | 2 | 50 | Methyldimethoxymethane | 5 | 0.25 | 30 |
| 18 | 10 | 50 | Vinyltrimethoxymethane | 2 | 0.18 | 20 |
| 19 | 11 | 50 | Vinyltrimethoxymethane | 2 | 0.25 | 30 |
| 20 | 12 | 50 | No modification | 2 | 0.39 | 45 |
| 21 | 1 | 50 | Methyldimethoxymethane | 2 | 0.23 | 25 |
| 22 | 1 | 50 | Methyldimethoxymethane | 2 | 0.23 | 25 |
| 23 | 1 | 50 | Methyldimethoxymethane | 2 | 0.23 | 25 |
| 24 | 1 | 50 | Methyldimethoxymethane | 2 | 0.23 | 25 |
| 25 | 14 | 100 | Methyldimethoxymethane | 2 | 0.45 | 100 |
| 26 | 14 | 100 | Methyldimethoxymethane | 2 | 0.45 | 100 |
| Comparative Production Example | 13 | 120 | No modification | 3.7 | 0.60 | 150 |

| Photosensitive Member Production Example No. | Undercoat layer Rsm (nm) | Charge-generating layer Coating liquid No. | Charge-generating agent | Position of peak in small-angle X-ray scattering (nm) | Half-width of peak in small-angle X-ray scattering (nm) | Thickness (μm) |
|---|---|---|---|---|---|---|
| 1 | 110 | 1 | HOGaPc | 38 | 38 | 0.2 |
| 2 | 110 | 1 | HOGaPc | 38 | 38 | 0.18 |
| 3 | 110 | 1 | HOGaPc | 38 | 38 | 0.16 |
| 4 | 110 | 1 | HOGaPc | 38 | 38 | 0.14 |
| 5 | 110 | 2 | HOGaPc | 30 | 40 | 0.2 |
| 6 | 110 | 3 | HOGaPc | 42 | 50 | 0.2 |
| 7 | 110 | 4 | HOGaPc | 48 | 46 | 0.2 |
| 8 | 120 | 1 | HOGaPc | 38 | 38 | 0.2 |
| 9 | 75 | 1 | HOGaPc | 38 | 38 | 0.2 |
| 10 | 78 | 1 | HOGaPc | 38 | 38 | 0.2 |
| 11 | 100 | 1 | HOGaPc | 38 | 38 | 0.2 |
| 12 | 110 | 1 | HOGaPc | 38 | 38 | 0.2 |
| 13 | 120 | 1 | HOGaPc | 38 | 38 | 0.2 |
| 14 | 130 | 1 | HOGaPc | 38 | 38 | 0.2 |
| 15 | 135 | 1 | HOGaPc | 38 | 38 | 0.2 |
| 16 | 120 | 1 | HOGaPc | 38 | 38 | 0.2 |
| 17 | 120 | 1 | HOGaPc | 38 | 38 | 0.2 |
| 18 | 110 | 1 | HOGaPc | 38 | 38 | 0.2 |
| 19 | 120 | 1 | HOGaPc | 38 | 38 | 0.2 |
| 20 | 115 | 1 | HOGaPc | 38 | 38 | 0.2 |
| 21 | 110 | 10 | TiOPc | 70 | 90 | 0.24 |
| 22 | 110 | 10 | TiOPc | 70 | 90 | 0.18 |
| 23 | 110 | 10 | TiOPc | 70 | 90 | 0.16 |
| 24 | 110 | 10 | TiOPc | 70 | 90 | 0.14 |
| 25 | 220 | 12 | TiOPc | 60 | 80 | 0.24 |
| 26 | 220 | 13 | TiOPc | 145 | 98 | 0.24 |
| Comparative Production Example | 250 | 11 | TiOPc | 160 | 200 | 0.2 |

[Evaluation of Electrophotographic Photosensitive Member]

The following evaluations (Examples 1 to 7 and Comparative Example) were performed for Photosensitive Member Production Examples above. The results are shown in Table 2.

[Evaluation of Electrophotographic Photosensitive Member]

<Evaluation of R, S2, and S3>

A photosensitive member tester (product name: CYNTHIA 59, manufactured by Gen-Tech, Inc.) was used in the evaluation of the R, S2, and S3 of each of the photosensitive members. The evaluation was performed after each of the photosensitive members of Examples and Comparative Example had been left to stand in the photosensitive member tester having established therein an environment having a temperature of 23.5° C. and a relative humidity of 50% RH for 24 hours or more. In addition, an electroconductive rubber roller having a diameter of 8 mm was used as a charging member.

In the measurement of the potential of each of the electrophotographic photosensitive members, a surface potential probe (model 6000B-8: manufactured by Trek Japan K.K.) was placed at a position distant from the electrophotographic photosensitive member by 1 mm, and a surface potentiometer (model 344: manufactured by Trek Japan K.K.) was used.

Under the foregoing conditions, in accordance with the above-mentioned procedures, the R, the S2, and the S3 were calculated from the equation (E1), the equation (E2), and the equation (E3), and were evaluated.

Figure 7:
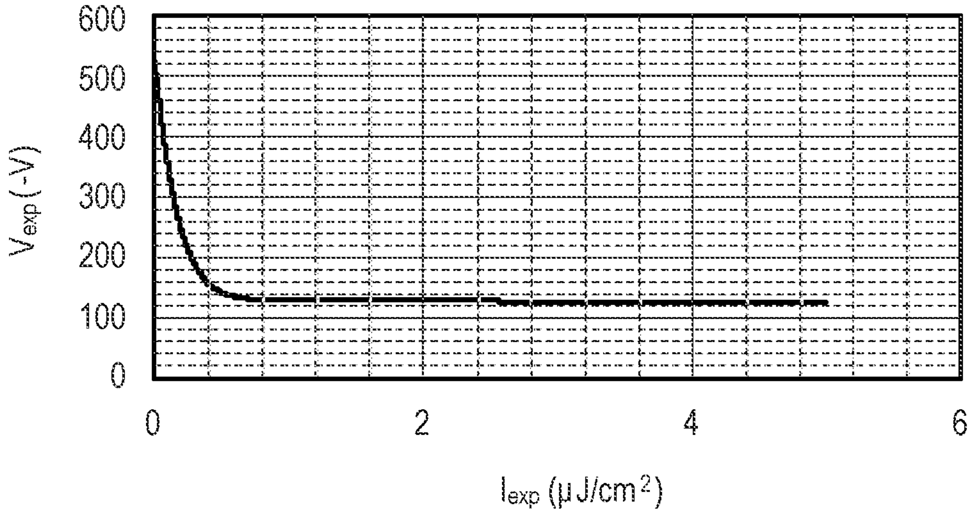
FIG. 7 is a graph obtained in Example 1 whose axis of ordinate and axis of abscissa indicate a $V_{exp}$ and an $I_{exp}$, respectively.
Figure 8:
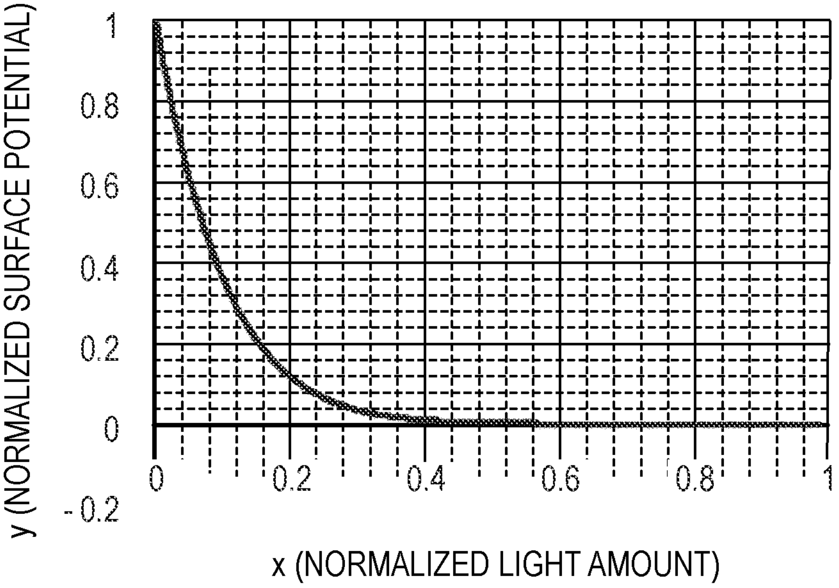
FIG. 8 is a graph obtained in Example 1 whose axis of ordinate and axis of abscissa indicate a "y" and an "x", respectively.
Figure 9:
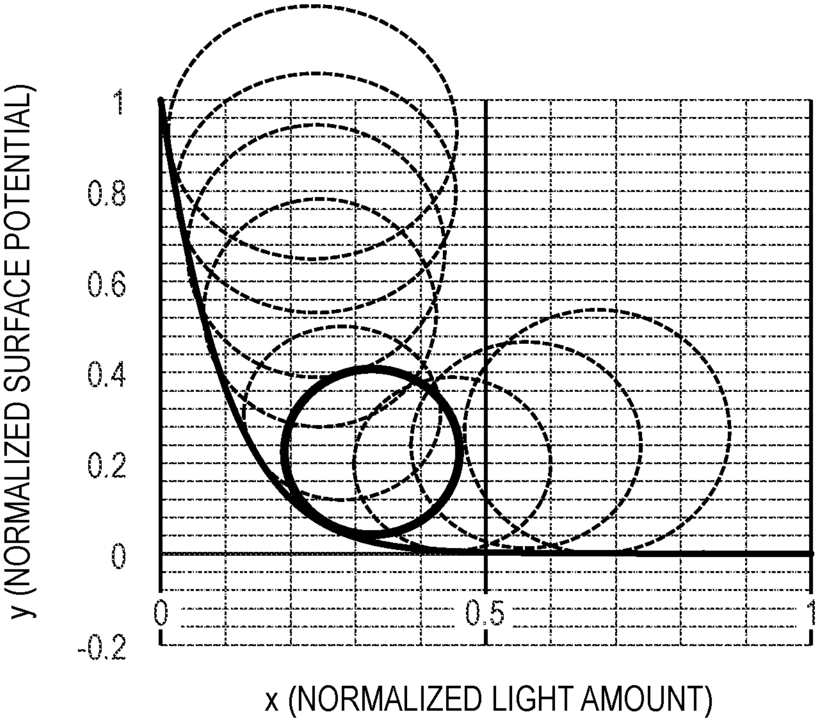
FIG. 9 is a graph for showing a change in minimum of the normalized radius of curvature R calculated in the graph obtained in Example 1 whose axis of abscissa and axis of ordinate indicate the "x" and the "y", respectively.
Figure 10:
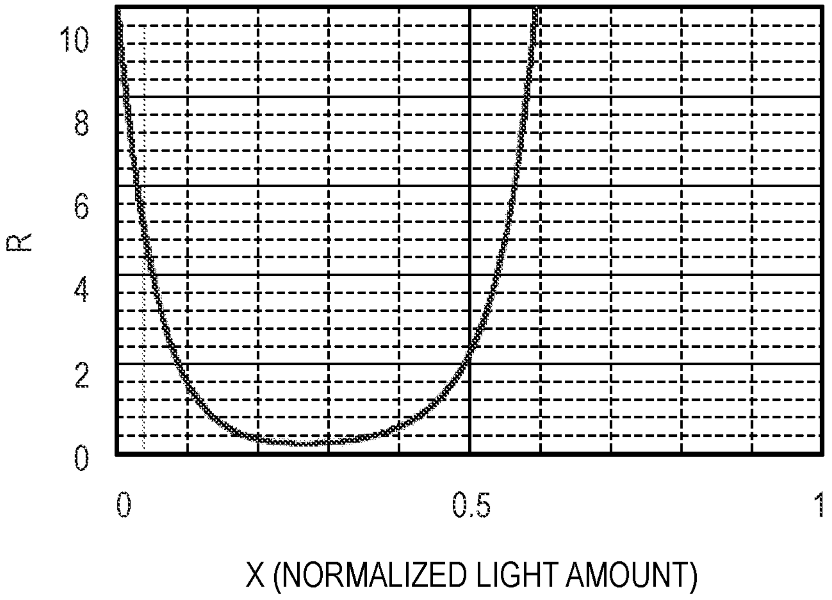
FIG. 10 is a graph obtained in Example 1 whose axis of ordinate and axis of abscissa indicate the R and the "x", respectively.

FIG. 7 is a graph for the photosensitive member obtained in Photosensitive Member Production Example 1 whose axis of ordinate and axis of abscissa indicate a $V_{exp}$ and an $I_{exp}$, respectively. FIG. 8 is a graph for the photosensitive member obtained in Photosensitive Member Production Example 1 whose axis of ordinate and axis of abscissa indicate a "y" and an "x", respectively. FIG. 10 is a graph for the photosensitive member obtained in Photosensitive Member Production Example 1 whose axis of ordinate and axis of abscissa indicate the R and the "x", respectively.

<Evaluation of Control of Exposed Portion Potential>

A reconstructed machine of a laser beam printer manufactured by Hewlett-Packard Company (product name: HP Color LaserJet Enterprise M652) was used as an electrophotographic apparatus for an evaluation. The printer was reconstructed in terms of the following points: the printer was reconstructed so as to be capable of regulating a voltage to be applied to its charging roller, regulating an image exposure light amount, and performing the sensing of a charge transfer amount and the control of the potential of an image-exposed portion described below. The sensing of a charge transfer amount per unit time was performed as described below. Each of the electrophotographic photosensitive members was charged with a charging unit, and image exposure was performed with the image-exposing unit in at least one light amount weaker than a light amount in which the normalized radius of curvature R of the electrophotographic photosensitive member represented by the equation (E1) showed the minimum. Further, image exposure was performed in at least two light amounts stronger than the light amount in which the normalized radius of curvature showed the minimum. That is, such a latent image as illustrated in FIG. 3 or FIG. 4 was formed on the photosensitive member. In other words, the image exposure was performed on at least three points of the photosensitive member while the light amount was changed (the number of the points may be optionally controlled), to thereby form three patterns of the electrostatic latent image (in accordance with the number of the image-exposed points). After that, a current flowed in each of the exposed portions by charging the exposed portion with the charging unit, and the charge transfer amount per unit time were measured through utilization of the current-sensing function (charge transfer amount-sensing unit) of the high-voltage power source. The control of the potential of the image-exposed portion was performed as follows: an image exposure amount was determined by graphing the sensing results as shown in FIG. 5, and determining the light amount at the point of intersection of extended lines, and the potential of the exposed portion was controlled.

The surface potential of the photosensitive member was measured by reconstructing the cartridge and mounting a potential probe (product name: model 6000B-8, manufactured by Trek Japan K.K.) on the developing position of the cartridge. The potential was measured with a surface potentiometer (product name: model 344, manufactured by Trek Japan K.K.). Under the foregoing conditions, a sensed light amount, and an error between each of the sensed light amount when the image exposure was performed on 3 points and that when the image exposure was performed on 6 points, and an actual light amount when the R showed the minimum were evaluated.

TABLE 2

| Example | Photosensitive Member Production Example No. | Minimum of normalized radius of curvature R | $Is_{0.5}$ | Slope S2 | $4Is_{0.5}$ | $5Is_{0.5}$ | $y4(Is_{0.5})$ | $y5(Is_{0.5})$ | Slope S3 |
|---|---|---|---|---|---|---|---|---|---|
| 1 | 1 | 0.188 | 0.097 | 5.14 | 0.389 | 0.487 | 0.022 | 0.015 | 0.068 |
| 2 | 2 | 0.204 | 0.080 | 6.25 | 0.320 | 0.400 | 0.069 | 0.052 | 0.207 |
| 3 | 3 | 0.238 | 0.071 | 7.04 | 0.310 | 0.380 | 0.082 | 0.062 | 0.286 |
| 4 | 4 | 0.231 | 0.062 | 8.06 | 0.410 | 0.430 | 0.072 | 0.065 | 0.350 |
| 5 | 5 | 0.19 | 0.092 | 5.43 | 0.387 | 0.487 | 0.022 | 0.015 | 0.070 |
| 6 | 6 | 0.189 | 0.096 | 5.21 | 0.388 | 0.488 | 0.021 | 0.014 | 0.070 |
| 7 | 7 | 0.188 | 0.097 | 5.15 | 0.388 | 0.488 | 0.022 | 0.015 | 0.070 |
| 8 | 8 | 0.238 | 0.071 | 7.04 | 0.310 | 0.380 | 0.082 | 0.062 | 0.286 |
| 9 | 9 | 0.187 | 0.098 | 5.10 | 0.387 | 0.487 | 0.023 | 0.017 | 0.060 |
| 10 | 10 | 0.191 | 0.097 | 5.15 | 0.390 | 0.490 | 0.023 | 0.016 | 0.070 |
| 11 | 11 | 0.19 | 0.098 | 5.10 | 0.389 | 0.489 | 0.024 | 0.017 | 0.070 |
| 12 | 12 | 0.187 | 0.096 | 5.21 | 0.388 | 0.488 | 0.026 | 0.019 | 0.070 |
| 13 | 13 | 0.188 | 0.095 | 5.26 | 0.387 | 0.487 | 0.025 | 0.018 | 0.070 |
| 14 | 14 | 0.231 | 0.062 | 8.06 | 0.410 | 0.430 | 0.072 | 0.065 | 0.350 |
| 15 | 15 | 0.231 | 0.062 | 8.06 | 0.410 | 0.430 | 0.072 | 0.065 | 0.350 |
| 16 | 16 | 0.235 | 0.068 | 7.40 | 0.269 | 0.335 | 0.126 | 0.099 | 0.406 |
| 17 | 17 | 0.237 | 0.070 | 7.15 | 0.268 | 0.335 | 0.126 | 0.092 | 0.505 |

TABLE 2-continued

| Example | Photosensitive Member Production Example No. | Minimum of normalized radius of curvature R | $Is_{0.5}$ | Slope S2 | $4Is_{0.5}$ | $5Is_{0.5}$ | $y4(Is_{0.5})$ | $y5(Is_{0.5})$ | Slope S3 |
|---|---|---|---|---|---|---|---|---|---|
| 18 | 18 | 0.188 | 0.097 | 5.14 | 0.389 | 0.487 | 0.022 | 0.015 | 0.068 |
| 19 | 19 | 0.188 | 0.097 | 5.14 | 0.389 | 0.487 | 0.022 | 0.015 | 0.068 |
| 20 | 20 | 0.231 | 0.062 | 8.06 | 0.410 | 0.430 | 0.072 | 0.065 | 0.350 |
| 21 | 21 | 0.21 | 0.080 | 6.25 | 0.320 | 0.400 | 0.071 | 0.051 | 0.250 |
| 22 | 22 | 0.237 | 0.070 | 7.15 | 0.268 | 0.335 | 0.126 | 0.105 | 0.311 |
| 23 | 23 | 0.235 | 0.068 | 7.40 | 0.269 | 0.335 | 0.126 | 0.099 | 0.406 |
| 24 | 24 | 0.237 | 0.070 | 7.15 | 0.268 | 0.335 | 0.126 | 0.092 | 0.505 |
| 25 | 25 | 0.235 | 0.068 | 7.40 | 0.269 | 0.335 | 0.126 | 0.089 | 0.558 |
| 26 | 26 | 0.237 | 0.064 | 7.81 | 0.270 | 0.340 | 0.129 | 0.090 | 0.557 |
| Comparative Example | Comparative Production Example | 0.252 | 0.057 | 8.77 | 0.229 | 0.287 | 0.098 | 0.066 | 0.552 |

TABLE 3

| | | Measurement performed on 3 image-exposed points | | Measurement performed on 6 image-exposed points | |
|---|---|---|---|---|---|
| Example | Actual light amount when R shows minimum ($\mu J/cm^2$) | Sensed light amount ($\mu J/cm^2$) | Error % \|Sensed light amount − actual light amount\|/actual light amount | Sensed light amount ($\mu J/cm^2$) | Error % \|Sensed light amount − actual light amount\|/actual light amount |
| 1 | 0.250 | 0.251 | 0.2% | 0.2502 | 0.1% |
| 2 | 0.260 | 0.266 | 2.4% | 0.262 | 0.8% |
| 3 | 0.270 | 0.277 | 2.8% | 0.273 | 1.1% |
| 4 | 0.310 | 0.319 | 3.0% | 0.316 | 1.9% |
| 5 | 0.251 | 0.252 | 0.4% | 0.2515 | 0.2% |
| 6 | 0.250 | 0.251 | 0.2% | 0.2502 | 0.1% |
| 7 | 0.249 | 0.250 | 0.4% | 0.2495 | 0.2% |
| 8 | 0.270 | 0.277 | 2.6% | 0.273 | 1.1% |
| 9 | 0.251 | 0.252 | 0.2% | 0.2512 | 0.1% |
| 10 | 0.252 | 0.253 | 0.4% | 0.2525 | 0.2% |
| 11 | 0.253 | 0.254 | 0.2% | 0.2533 | 0.1% |
| 12 | 0.249 | 0.250 | 0.4% | 0.2495 | 0.2% |
| 13 | 0.248 | 0.249 | 0.2% | 0.2483 | 0.1% |
| 14 | 0.310 | 0.319 | 2.9% | 0.313 | 1.0% |
| 15 | 0.317 | 0.333 | 5.0% | 0.325 | 2.6% |
| 16 | 0.310 | 0.319 | 2.9% | 0.314 | 1.3% |
| 17 | 0.351 | 0.373 | 6.3% | 0.363 | 3.4% |
| 18 | 0.250 | 0.251 | 0.2% | 0.2502 | 0.1% |
| 19 | 0.250 | 0.251 | 0.2% | 0.2502 | 0.1% |
| 20 | 0.310 | 0.319 | 2.9% | 0.312 | 0.6% |
| 21 | 0.325 | 0.335 | 3.2% | 0.33 | 1.7% |
| 22 | 0.336 | 0.350 | 4.2% | 0.343 | 2.1% |
| 23 | 0.317 | 0.333 | 5.0% | 0.325 | 2.6% |
| 24 | 0.351 | 0.373 | 6.3% | 0.363 | 3.4% |
| 25 | 0.362 | 0.389 | 7.5% | 0.378 | 4.4% |
| 26 | 0.365 | 0.393 | 7.7% | 0.381 | 4.4% |
| Comparative Example | 0.395 | 0.226 | 42.9% | 0.25 | 36.8% |

It was found that when the number of measured points was increased, specifically, the measurement was performed on 3 image-exposed points and then on 6 image-exposed points, the error became smaller, though a sensing time became longer. In addition, it was found that when the R became smaller than 0.24, the error became smaller. In addition, as shown in Comparative Example, it was found that when the R became larger than 0.24, the error became larger.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-130215, filed Aug. 6, 2021, which is hereby incorporated by reference herein in its entirety.

What is claimed is:

1. An electrophotographic apparatus, comprising:

an electrophotographic photosensitive member comprising, in this order, (i) a support, (ii) an undercoat layer containing a polyamide resin and metal oxide particles, (iii) a charge-generating layer containing a charge-generating substance, the charge-generating substance comprising a titanyl phthalocyanine pigment or a hydroxygallium phthalocyanine pigment, and (iv) a charge-transporting layer containing a charge-transporting substance;

a charging unit configured to charge the electrophotographic photosensitive member;

an image-exposing unit configured to irradiate a surface of the electrophotographic photosensitive member with image exposure light to form an electrostatic latent image on the surface of the electrophotographic photosensitive member;

a developing unit configured to develop the electrostatic latent image with toner to form a toner image on the surface of the electrophotographic photosensitive member;

a transferring unit configured to transfer the toner image from the surface of the electrophotographic photosensitive member onto a transfer material;

a charge transfer amount-sensing unit configured to sense an amount of charge transferred to the electrophotographic photosensitive member by discharge per unit time; and an exposed portion potential-controlling unit configured to control a potential of each of exposed portions of the electrophotographic photosensitive member based on a sensing result obtained by (i) charging the electrophotographic photosensitive member with the charging unit, (ii) performing image exposure with the image-exposing unit in a first light amount (μJ/cm$^2$) weaker than a light amount in which a normalized radius of curvature R of the electrophotographic photosensitive member represented by equation (E1) shows a minimum, and in second light amounts (μJ/cm$^2$) stronger than the light amount in which the normalized radius of curvature R shows the minimum, and (iii) sensing an amount of charge transferred to the electrophotographic photosensitive member per unit time at a time of charging of the exposed portion with the charge transfer amount-sensing unit, wherein the normalized radius of curvature R of the electrophotographic photosensitive member has a minimum of 0.24 or less, which is calculated from the following equation (E1) in a graph whose axis of abscissa and axis of ordinate indicate an "x" and a "y", respectively, as described below:

when at a temperature of 23.5 (° C.) and a relative humidity of 50 (% RH)

(1) a surface potential of the electrophotographic photosensitive member is set to 0 (V), (2) the electrophotographic photosensitive member is charged for 0.005 second so that an absolute value of an initial surface potential of the electrophotographic photosensitive member becomes 500 (V), (3) the electrophotographic photosensitive member is exposed to light having a wavelength of 805 (nm) and an intensity of 25 (mW/cm$^2$) in a light amount $I_{exp}$ (μJ/cm$^2$) for "t" seconds continuously 0.02 second after a start of the charging, and (4) an absolute value of the surface potential of the electrophotographic photosensitive member after the exposure obtained through measurement 0.06 second after the start of the charging is represented by $V_{exp}$ (V), in a graph whose axis of abscissa and axis of ordinate indicate the $I_{exp}$ and the $V_{exp}$, respectively, the graph being obtained by repeatedly performing the measurements (1) to (4) while changing the $I_{exp}$ from 0.000 to 1.000 (μJ/cm$^2$) at intervals of 0.001 (μJ/cm$^2$) through a change in "t", when a light amount when the $V_{exp}$ of the graph=250 (V) is represented by $I_{1/2}$ (μJ/cm$^2$), a normalized light amount obtained by normalizing the axis of abscissa $I_{exp}$ so that $10 \cdot I_{1/2}$ becomes 1 is represented by "x", and a normalized surface potential obtained by normalizing the axis of ordinate $V_{exp}$ so that a value 500 (V) of the axis of ordinate of the graph becomes 1 and a value thereof when x=1 becomes 0 is represented by "y":

$$R = \frac{\left[1 + \left(\frac{dy}{dx}\right)^2\right]^{3/2}}{\left|\frac{d^2 y}{dx^2}\right|} \quad \text{(E1)}$$

the titanyl phthalocyanine pigment comprises crystal particles having a crystal form showing peaks at Bragg angles 2θ of 9.8°±0.3° and 27.1°±0.3° in an X-ray diffraction spectrum using a CuKα ray, and has a peak at 50 to 150 nm in a crystal particle size distribution measured by using small-angle X-ray scattering, and a half-width of the peak is 100 nm or less, and the hydroxygallium phthalocyanine pigment comprises crystal particles having a crystal form showing peaks at Bragg angles 2θ of 7.4°±0.3° and 28.2°±0.3° in an X-ray diffraction spectrum using a CuKα ray, and has a peak at 30 to 50 nm in a crystal particle size distribution measured by using small-angle X-ray scattering, and a half-width of the peak is 50 nm or less.

2. The electrophotographic apparatus according to claim 1, wherein the normalized radius of curvature R has a minimum of 0.21 or less.

3. The electrophotographic apparatus according to claim 1, wherein when at a temperature of 23.5 (° C.) and a relative humidity of 50 (% RH), (1) a surface potential of the electrophotographic photosensitive member is set to 0 (V), (2) the electrophotographic photosensitive member is charged for 0.005 second so that an absolute value of an initial surface potential of the electrophotographic photosensitive member becomes 500 (V), (3) the electrophotographic photosensitive member is exposed to light having a wavelength of 805 [nm] and an intensity of 25 (mW/cm$^2$) in a light amount $I_{exp}$ (μJ/cm$^2$) for "t" seconds continuously 0.02 second after a start of the charging, and (4) an absolute value of the surface potential of the electrophotographic photosensitive member after the exposure obtained through measurement 0.06 second after the start of the charging is represented by $V_{exp}$ (V), in a graph whose axis of abscissa and axis of ordinate indicate the $I_{exp}$ and the $V_{exp}$, respectively, the graph being obtained by repeatedly performing the measurements (1) to (4) while changing the $I_{exp}$ from 0.000 to 1.000 (μJ/cm$^2$) at intervals of 0.001 (μJ/cm$^2$) through a change in "t", when a normalized light amount "x" when a normalized surface potential "y" of the graph=0.5 is represented by $Is_{0.5}$ (μJ/cm$^2$), a quadruple light amount of the light amount $Is_{0.5}$ is represented by $4Is_{0.5}$ (μJ/cm$^2$), a quintuple light amount thereof is represented by $5Is_{0.5}$ (μJ/cm$^2$), the y when $x=4Is_{0.5}$ is represented by y4, and the y when $x=5Is_{0.5}$ is represented by y5, slopes S2 and S3 of the electrophotographic photosensitive member satisfy S2≥3.0 and S3≤0.41 when $$S2 = \frac{0.5}{Is_{0.5}} \text{ and } S3 = \frac{|y4 - y5|}{|4Is_{0.5} - 5Is_{05}|}.$$

4. The electrophotographic apparatus according to claim 3, wherein S3 is 0.21 or less.

5. The electrophotographic apparatus according to claim 3, wherein S3 is 0.15 or less.

6. The electrophotographic apparatus according to claim 1, wherein the exposed portion potential-controlling unit is a unit for controlling a potential of each of exposed portions of the electrophotographic photosensitive member based on a sensing result obtained by performing image exposure with the image-exposing unit in at least "n" light amounts where "n" represents an integer of 2 or more, the light amounts being weaker than the light amount in which the normalized radius of curvature R of the electrophotographic photosensitive member shows the minimum, and in at least "m" light amounts where "m" represents an integer of 3 or more, the light amounts being stronger than the light amount in which the normalized radius of curvature R shows the minimum, and sensing an amount of charge transferred to the electrophotographic photosensitive member per unit time at a time of charging of the exposed portion with the charge transfer amount-sensing unit.

7. The electrophotographic apparatus according to claim 1, wherein the metal oxide particles are titanium oxide particles, and the titanium oxide particles have an average primary particle diameter of 10 to 100 nm.

8. The electrophotographic apparatus according to claim 1, wherein the undercoat layer has a thickness of 0.5 to 3.0 μm.

9. The electrophotographic apparatus according to claim 1, wherein the charge-generating substance comprises the titanyl phthalocyanine pigment.

10. The electrophotographic apparatus according to claim 1, wherein the charge-generating substance comprises the hydroxygallium phthalocyanine pigment.

11. The electrophotographic apparatus according to claim 1, wherein the charge-generating layer has a thickness of 0.16 μm or more.

12. An electrophotographic apparatus, comprising:

an electrophotographic photosensitive member comprising a support, an undercoat layer, a charge-generating layer and a charge-transporting layer, in this order;

a charging unit configured to charge the electrophotographic photosensitive member;

an image-exposing unit configured to irradiate a surface of the electrophotographic photosensitive member with image exposure light to form an electrostatic latent image on the surface of the electrophotographic photosensitive member;

a developing unit configured to develop the electrostatic latent image with toner to form a toner image on the surface of the electrophotographic photosensitive member;

a transferring unit configured to transfer the toner image from the surface of the electrophotographic photosensitive member onto a transfer material;

a charge transfer amount-sensing unit configured to sense an amount of charge transferred to the electrophotographic photosensitive member by discharge per unit time; and an exposed portion potential-controlling unit configured to control a potential of each of exposed portions of the electrophotographic photosensitive member based on a sensing result obtained by (i) charging the electrophotographic photosensitive member with the charging unit, (ii) performing image exposure with the image-exposing unit in first light amount (μJ/cm$^2$) weaker than a light amount in which a normalized radius of curvature R of the electrophotographic photosensitive member represented by the following equation (E1) shows a minimum, and in second light amount (μJ/cm$^2$) stronger than the light amount in which the normalized radius of curvature R shows the minimum, and (iii) sensing an amount of charge transferred to the electrophotographic photosensitive member per unit time at a time of charging of the exposed portion with the charge transfer amount-sensing unit, wherein the normalized radius of curvature R of the electrophotographic photosensitive member has a minimum of 0.24 or less, which is calculated from the following equation (E1) in a graph whose axis of abscissa and axis of ordinate indicate an "x" and a "y", respectively, as described below:

when at a temperature of 23.5 (C) and a relative humidity of 50 (% RH)

(1) a surface potential of the electrophotographic photosensitive member is set to 0 (V), (2) the electrophotographic photosensitive member is charged for 0.005 second so that an absolute value of an initial surface potential of the electrophotographic photosensitive member becomes 500 (V), (3) the electrophotographic photosensitive member is exposed to light having a wavelength of 805 (nm) and an intensity of 25 (mW/cm$^2$) in a light amount $I_{exp}$ (μJ/cm$^2$) for "t" seconds continuously 0.02 second after a start of the charging, and (4) an absolute value of the surface potential of the electrophotographic photosensitive member after the exposure obtained through measurement 0.06 second after the start of the charging is represented by $V_{exp}$ (V), in a graph whose axis of abscissa and axis of ordinate indicate the $I_{exp}$ and the $V_{exp}$, respectively, the graph being obtained by repeatedly performing the measurements (1) to (4) while changing the $I_{exp}$ from 0.000 to 1.000 (μJ/cm$^2$) at intervals of 0.001 (μJ/cm$^2$) through a change in "t", when a light amount when the $V_{exp}$ of the graph=250 (V) is represented by $I_{1/2}$ (μJ/cm$^2$), a normalized light amount obtained by normalizing the axis of abscissa $I_{exp}$ SO that $10 \cdot I_{1/2}$ becomes 1 is represented by "x", and a normalized surface potential obtained by normalizing the axis of ordinate $V_{exp}$ so that a value 500 [V] of the axis of ordinate of the graph becomes 1 and a value thereof when x=1 becomes 0 is represented by "y":

$$R = \frac{\left[1 + \left(\frac{dy}{dx}\right)^2\right]^{3/2}}{\left|\frac{d^2y}{dx^2}\right|}, \quad \text{(E1)}$$

the undercoat layer contains metal oxide particles, the charge-generating layer contains a charge-generating substance comprising a titanyl phthalocyanine pigment or a hydroxygallium phthalocyanine pigment, the titanyl phthalocyanine pigment comprises crystal particles having a crystal form showing peaks at Bragg angles 2θ of 9.8°±0.3° and 27.1°±0.3° in an X-ray diffraction spectrum using a CuKα ray, and has a peak at 50 to 150 nm in a crystal particle size distribution measured by using small-angle X-ray scattering, and a half-width of the peak is 100 nm or less, and the hydroxygallium phthalocyanine pigment comprises crystal particles having a crystal form showing peaks at Bragg angles 2θ of 7.4°±0.3° and 28.2°±0.3° in an X-ray diffraction spectrum using a CuKα ray, and has a peak at 30 to 50 nm in a crystal particle size distribution measured by using small-angle X-ray scattering, and a half-width of the peak is 50 nm or less.

13. The electrophotographic apparatus according to claim 12, wherein the charge-generating substance comprises the titanyl phthalocyanine pigment.

14. The electrophotographic apparatus according to claim 12, wherein the charge-generating substance comprises the hydroxygallium phthalocyanine pigment.

15. An electrophotographic apparatus, comprising:

an electrophotographic photosensitive member comprising a support, an undercoat layer, a charge-generating layer and a charge-transporting layer, in this order;

a charging unit configured to charge the electrophotographic photosensitive member;

an image-exposing unit configured to irradiate a surface of the electrophotographic photosensitive member with image exposure light to form an electrostatic latent image on the surface of the electrophotographic photosensitive member;

a developing unit configured to develop the electrostatic latent image with toner to form a toner image on the surface of the electrophotographic photosensitive member;

a transferring unit configured to transfer the toner image from the surface of the electrophotographic photosensitive member onto a transfer material;

a charge transfer amount-sensing unit configured to sense an amount of charge transferred to the electrophotographic photosensitive member by discharge per unit time; and an exposed portion potential-controlling unit configured to control a potential of each of exposed portions of the electrophotographic photosensitive member based on a sensing result obtained by (i) charging the electrophotographic photosensitive member with the charging unit, (ii) performing image exposure with the image-exposing unit in first light amount ($\mu J/cm^2$) weaker than a light amount in which a normalized radius of curvature R of the electrophotographic photosensitive member represented by the following equation (E1) shows a minimum, and in second light amount ($\mu J/cm^2$) stronger than the light amount in which the normalized radius of curvature R shows the minimum, and (iii) sensing an amount of charge transferred to the electrophotographic photosensitive member per unit time at a time of charging of the exposed portion with the charge transfer amount-sensing unit, wherein the normalized radius of curvature R of the electrophotographic photosensitive member has a minimum of 0.24 or less, which is calculated from the following equation (E1) in a graph whose axis of abscissa and axis of ordinate indicate an "x" and a "y", respectively, as described below:

when at a temperature of 23.5 (C) and a relative humidity of 50 (% RH)

(1) a surface potential of the electrophotographic photosensitive member is set to 0 (V), (2) the electrophotographic photosensitive member is charged for 0.005 second so that an absolute value of an initial surface potential of the electrophotographic photosensitive member becomes 500 (V), (3) the electrophotographic photosensitive member is exposed to light having a wavelength of 805 (nm) and an intensity of 25 ($mW/cm^2$) in a light amount $I_{exp}$ ($\mu J/cm^2$) for "t" seconds continuously 0.02 second after a start of the charging, and (4) an absolute value of the surface potential of the electrophotographic photosensitive member after the exposure obtained through measurement 0.06 second after the start of the charging is represented by $V_{exp}$ (V), in a graph whose axis of abscissa and axis of ordinate indicate the $I_{exp}$ and the $V_{exp}$, respectively, the graph being obtained by repeatedly performing the measurements (1) to (4) while changing the $I_{exp}$ from 0.000 to 1.000 ($\mu J/cm^2$) at intervals of 0.001 ($\mu J/cm^2$) through a change in "t", when a light amount when the $V_{exp}$ of the graph=250 (V) is represented by $I_{1/2}$ ($\mu J/cm^2$), a normalized light amount obtained by normalizing the axis of abscissa $I_{exp}$ SO that $10 \cdot I_{1/2}$ becomes 1 is represented by "x", and a normalized surface potential obtained by normalizing the axis of ordinate $V_{exp}$ so that a value 500 [V] of the axis of ordinate of the graph becomes 1 and a value thereof when x=1 becomes 0 is represented by "y":

$$R = \frac{\left[1+\left(\frac{dy}{dx}\right)^2\right]^{3/2}}{\left|\frac{d^2y}{dx^2}\right|}, \quad \text{(E1)}$$

the charge-transporting layer contains a charge-transporting substance comprising a compound represented by the formulae

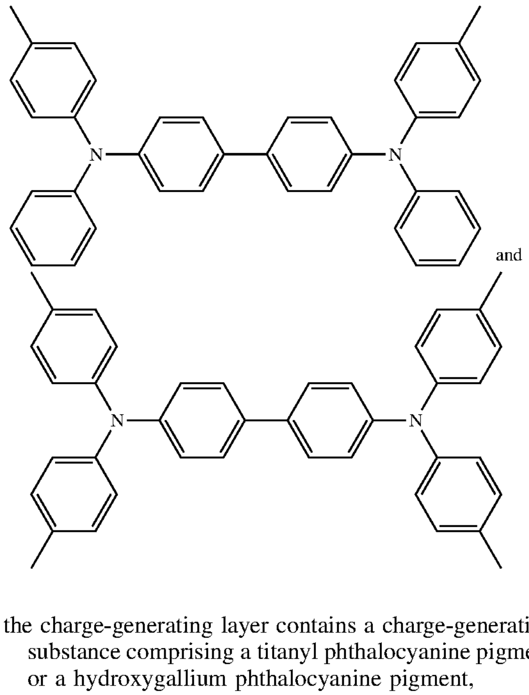

and the charge-generating layer contains a charge-generating substance comprising a titanyl phthalocyanine pigment or a hydroxygallium phthalocyanine pigment, the titanyl phthalocyanine pigment comprises crystal particles having a crystal form showing peaks at Bragg angles 2θ of 9.8°±0.3° and 27.1°±0.3° in an X-ray diffraction spectrum using a CuKα ray, and has a peak at 50 to 150 nm in a crystal particle size distribution measured by using small-angle X-ray scattering, and a half-width of the peak is 100 nm or less, and the hydroxygallium phthalocyanine pigment comprises crystal particles having a crystal form showing peaks at Bragg angles 2θ of 7.4°±0.3° and 28.2°±0.3° in an X-ray diffraction spectrum using a CuKα ray, and has a peak at 30 to 50 nm in a crystal particle size distribution measured by using small-angle X-ray scattering, and a half-width of the peak is 50 nm or less.

16. The electrophotographic apparatus according to claim 15, wherein the charge-generating substance comprises the titanyl phthalocyanine pigment.

17. The electrophotographic apparatus according to claim 15, wherein the charge-generating substance comprises the hydroxygallium phthalocyanine pigment.

* * * * *